US009652801B2

(12) United States Patent
Roux et al.

(10) Patent No.: US 9,652,801 B2
(45) Date of Patent: May 16, 2017

(54) SYSTEM AND COMPUTER METHOD FOR TRACKING ONLINE ACTIONS

(71) Applicant: Countr, Inc., New York, NY (US)

(72) Inventors: Manon Roux, New York, NY (US); Rameez Saleh, New York, NY (US)

(73) Assignee: Countr, Inc., New York, NY (US)

( * ) Notice: Subject to any disclaimer, the term of this patent is extended or adjusted under 35 U.S.C. 154(b) by 0 days.

(21) Appl. No.: 14/800,872

(22) Filed: Jul. 16, 2015

(65) Prior Publication Data

US 2017/0018023 A1 Jan. 19, 2017

(51) Int. Cl.
*G06Q 30/06* (2012.01)
*G06F 3/0484* (2013.01)
*G06N 3/00* (2006.01)
*G06Q 30/02* (2012.01)
G06F 17/30 (2006.01)
G06F 11/34 (2006.01)

(52) U.S. Cl.
CPC ....... *G06Q 30/0641* (2013.01); *G06F 3/0484* (2013.01); *G06N 3/006* (2013.01); *G06Q 30/0226* (2013.01); *G06F 11/3438* (2013.01); *G06F 17/30876* (2013.01)

(58) Field of Classification Search
CPC ........... G06F 17/30876; G06F 11/3438; G06F 3/0484; G06Q 30/0641
See application file for complete search history.

(56) References Cited

U.S. PATENT DOCUMENTS

| 7,904,331 | B2 | 3/2011 | Keil et al. |
| 8,214,264 | B2 | 7/2012 | Kasavin et al. |
| 8,306,975 | B1 | 11/2012 | Eldering |
| 2002/0103692 | A1 | 8/2002 | Rosenberg et al. |
| 2007/0276729 | A1 | 11/2007 | Freer |

(Continued)

FOREIGN PATENT DOCUMENTS

KR 10-0955289 B1 4/2010
WO 2011/076524 A1 6/2011

(Continued)

OTHER PUBLICATIONS

TRC; Identifying the Key Drivers of Purchase Intent; Undated (6 pages).

(Continued)

*Primary Examiner* — Sherrod Keaton
(74) *Attorney, Agent, or Firm* — Nixon Peabody LLP

(57) ABSTRACT

System and computer-implemented method of dynamically modifying a user interface and displaying a circular meter with a selectable slider. The identity of the UI is extracted from the UI and looked up in a table to determine two scores associated with the UI. A UI-specific score indicates how many actions a user has taken with the UI, and a total score indicates how many actions a user has taken with all UIs that the user has permitted to track. A graphic having two concentric circular meters is combined with the UI to produce a composite UI that is displayed to the user as the user is interacting with the UI. The meters fill up in opposite directions, and a slider on one of the meters can be slid clockwise or anti-clockwise to permit the user to make a selection based on the two scores.

19 Claims, 23 Drawing Sheets

(56) References Cited

U.S. PATENT DOCUMENTS

| | | | |
|---|---|---|---|
| 2008/0077461 A1* | 3/2008 | Glick | G06Q 10/06 705/7.29 |
| 2008/0154737 A1 | 6/2008 | Linkswiler | |
| 2009/0292583 A1* | 11/2009 | Eilam | G06Q 10/06 705/7.31 |
| 2010/0125657 A1 | 5/2010 | Dowling et al. | |
| 2010/0162152 A1 | 6/2010 | Allyn et al. | |
| 2012/0078684 A1 | 3/2012 | Maciocci et al. | |
| 2012/0197732 A1 | 8/2012 | Shen et al. | |
| 2013/0041726 A1 | 2/2013 | Hall | |
| 2013/0124257 A1 | 5/2013 | Schubert | |
| 2013/0179440 A1 | 7/2013 | Gordon | |
| 2013/0212479 A1* | 8/2013 | Willis | G06Q 10/10 715/736 |
| 2014/0057239 A1* | 2/2014 | Vehovsky | G09B 5/06 434/322 |
| 2014/0173478 A1* | 6/2014 | Krane | G06F 3/04847 715/765 |
| 2014/0236789 A1* | 8/2014 | Caldwell | G06Q 40/02 705/35 |
| 2015/0006261 A1* | 1/2015 | Gutman | G06Q 50/22 705/7.39 |
| 2015/0106191 A1* | 4/2015 | Ge | G06Q 30/0275 705/14.45 |

FOREIGN PATENT DOCUMENTS

| | | |
|---|---|---|
| WO | 2013/006654 A2 | 1/2013 |
| WO | 2013/023295 A1 | 2/2013 |
| WO | 2014/105401 A1 | 7/2014 |

OTHER PUBLICATIONS

Eric Risen and Larry Risen; BioTrak Research Inc.; The Use of Intent Scale Translations to Predict Purchase Interest; Dated Dec. 19, 2008; (7 pages).

Chapman; Product Interest and Engagement Scale, Beta (PIES—beta): Initial Development; Dated 2009; (6 pages).

Heussner, Ki Mae; Yahoo Launches New Social Sentiment Slider/Adweek; Yahoo lets Brands Get More Social Aims to Make Content More Engaging, Shareable; Downloaded Jul. 15, 2015; (2 pages).

International Search Report corresponding to co-pending PCT Patent Application No. PCT/US2016/042689, European Patent Office, dated Sep. 20, 2016; (6 pages).

International Written Opinion corresponding to co-pending PCT Patent Application No. PCT/US2016/042689, European Patent Office, dated Sep. 20, 2016; (7 pages).

* cited by examiner

FIG. 6

FIG. 16 ps://www.google.com/url?sa=i&url=https%3A%2F%2Fpatents.google.com&psig=

SYSTEM AND COMPUTER METHOD FOR TRACKING ONLINE ACTIONS

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE PRESENT DISCLOSURE

Aspects of the present disclosure relate generally to systems and methods of improving interactions with a machine using an electronic human-machine interface and an electronic display.

BACKGROUND

Online users or users of smartphone or tablet "apps" as they are called today take various types of intentional actions on websites or computer systems they access over a computer network, such as the Internet. Owners or operators of websites or computer systems accessed by the users have very limited visibility, if any, into a user's overall online interactions with that owner or operator's website or computer system let alone other websites or computer systems owned or operated by others. Relatedly, online users or users of apps lack a mechanism for informing an owner or operator of a website or computer system the frequency or extent of that user's online activities generally or with that owner or operator's website or computer system. Web browser or app users also lack a mechanism for viewing at a glance their historical activities with a particular owner or operator or generally with multiple owners or operators across a computer network. Aspects of the present disclosure solve these and other problems and fulfill these and other needs.

SUMMARY

Having this enhanced visibility would improve the computer network by making interactions between users and operators more meaningful and efficient. Millions of online transactions and activities are conducted every day with little if any historical context or understanding about the value of the user who accesses a particular computer system or service.

According to an aspect of the present disclosure, a computer-implemented method is disclosed of dynamically modifying an electronic user interface downloaded for display on one or more electronic video displays. The method includes: capturing, using an electronic computer, a plurality of physical inputs made via one or more human-machine interface devices. Each of the inputs is indicative of a human-machine action taken on one or more software applications and associated with an electronic user account of a human user. The human-machine action includes receiving an electronic representation of a physical input of a selectable element on an electronic user interface featuring one or more items. The electronic user account includes a name of the human user. The method further includes associating, using the computer, each of the plurality of inputs with a corresponding point value, where an extent of the point value is a function of at least a type of the respective human-machine action associated with the respective one of the inputs, to produce a plurality of point values; calculating, using the computer, a total score based on all of the corresponding point values associated with the plurality of physical inputs; calculating, using the computer, for each of a plurality of existing electronic user interfaces, an interface-specific score that is based on at least some of the point values associated with the corresponding one of the plurality of existing electronic user interfaces; dynamically generating, using the computer, a composite electronic user interface from at least (1) a selected one of the existing electronic user interfaces downloaded from an external computer server over a computer network (selected user interface) and (2) the interface-specific score corresponding to the selected user interface.

The dynamically generating includes: extracting, from the selected user interface or the external computer server, at least identification information of the selected user interface to determine which of the interface-specific scores to select, retrieving, using the computer, the total score and the selected interface-specific score that corresponds to the selected user interface determined by the extracting, and featuring a dynamically changing graphical representation with the existing electronic user interface, the dynamically changing graphical representation featuring a first graphical element representing the selected interface-specific score corresponding to the selected user interface and a second graphical element representing the total score, to produce the composite electronic user interface that includes at least a portion of the existing electronic user interface and the dynamically changing graphical representation. The computer-implemented method further including causing the composite electronic user interface to be displayed on one of the one or more electronic video display devices.

The extracting can further extracts an attribute of an item portrayed on the selected user interface, wherein the attribute includes a number indicative of a value of the item. The identification information extracted from the selected user interface can include an identity of a creator or owner of the content portrayed on the selected user interface or an operator of the selected user interface. The attribute can further include any one or more of an image of the item, a quantity of a desired number of the items, a size of the item, a color of the item, or an expiration of the item. The extracting can include connecting to the external server via an application programming interface (API) and requesting through the API the identification information and the attribute.

The computer-implemented can further include: dynamically generating, using the computer, a second composite electronic user interface from at least (1) a second selected one of the existing electronic user interfaces downloaded from a second external computer server over a computer network (second selected user interface) and (2) the interface-specific score corresponding to the second selected user interface. The dynamically generating the second composite electronic user interface includes: extracting, from the second selected user interface or the second external computer server, at least identification information of the second selected user interface to determine a second one of the interface-specific scores to select, retrieving, using the computer, the total score and the selected second interface-specific score that corresponds to the second selected user interface, and dynamically changing the graphical representation on the second existing electronic user interface such that the first graphical element represents the second selected interface-specific score corresponding to the second selected user interface and the second graphical element represents the total score, to produce the second composite electronic user interface that includes at least a portion of the second existing electronic user interface and the dynamically changed graphical representation. The computer-implemented method further includes causing the second composite electronic user interface to be displayed on any of the one or more electronic video display devices.

The computer-implemented method further includes: monitoring, using the computer, a frequency that the plurality of physical inputs are made; and enhancing the extent of the point value as a function of the frequency such that point values are accumulated toward the total score at a faster rate as the frequency increases. The type of the human-machine action can include (1) completing an electronic transaction to cause an item to be conveyed to a physical location as directed by the human user associated with the user account, (2) submitting an electronic review for an item portrayed on an electronic user interface, (3) sharing information about an item on a social media networking user interface, or (4) storing information about an item for later retrieval for completing an electronic transaction involving the stored item.

Prior to the step of dynamically generating, each of the existing electronic user interfaces can be unmodified by the claimed method. The one or more software applications can include an electronic web browser used on a computing device operated by the user or a dedicated software application used on a computing device operated by the user. The computing device can be a personal computer, a portable tablet computer, a portable smartphone, or a portable laptop computer.

The dynamically generating can further include: adding to the composite electronic user interface a selectable element that, in response to being selected via the one or more human-machine interface devices, causes the composite electronic user interface as displayed on the electronic video to include attributes of the item including its value. The computer-implemented method can further include dynamically changing the second graphical element as the total score increases as a result of accumulating additional point value associated with additional physical inputs on the one or more software applications; and updating the composite electronic user interface to cause any of the one or more electronic video displays device to display the dynamically changed second graphical element in real time.

The computer-implemented method can further include: receiving, via the one or more human-machine interface devices, a physical input representing a reduction in the value of the item; receiving, via the electronic network interface device, an indication whether the reduction is accepted; responsive to the reduction being accepted, the computer determining whether the reduction exceeds a threshold, and, if so, reducing the interface-specific score to produce a reduced score; causing to be displayed on the electronic video display device a new value based on the value and the reduction; and the electronic computer communicating over the computer network to complete an electronic transaction on the composite user interface using the new value to cause the item to be conveyed to a physical location as directed by the human user associated with the user account.

The threshold can be commensurate with the interface-specific score such that the higher the interface-specific score the higher the threshold, thereby allowing a higher reduction to be requested the higher the interface-specific score. The computer-implemented method can further include determining, based on at least the interface-specific score, a selected one of a plurality of levels, where each of the levels defines a range of permissible reductions and a range of protected reductions. The range of permissible reductions can be bounded by a minimum reduction that can be requested to reduce the value of the item and by a maximum reduction that can be requested to reduce the value of the item. The range of protected reductions can be bounded by a minimum protected reduction that can be requested to reduce the value of the item without causing a reduction in the interface-specific score or in the total score and by a maximum protected reduction that can be requested to reduce the value of the item without causing a reduction in the interface-specific score or in the total score. The range of permissible reductions and the range of protected reductions can increase with each level of the plurality of levels.

The dynamically changing graphical representation can be portrayed on the electronic video display as an overlay relative to the existing electronic user interface or is embedded into the existing electronic user interface. The graphical representation can include an avatar. The computer-implemented method can further include communicating, via an electronic network interface device, the reduction to the external computer server.

The first graphical element can have a first elongated curved shape following a first generally curved path and be at least partially filled with a first visually distinguishable indicia in a clockwise or anti-clockwise direction along the first generally curved path. An extent of the first visually distinguishable indicia can be commensurate with the selected one of the plurality of interface-specific scores. The second graphical element can have a second elongated curved shape following a second generally curved path concentric with the first generally curved path and be at least partially filled with a second visually distinguishable indicia in the other of the clockwise or anti-clockwise direction along the second generally curved path. The first visually distinguishable indicia can be visually distinguishable from the second visually distinguishable indicia. An extent of the second visually distinguishable indicia can be commensurate with the total score.

The computer-implemented method can further include: causing to be displayed on the composite electronic user interface a selectable graphical element on the second graphical element, wherein the selectable graphical element is made to appear on the electronic video display device to slide along the second elongated curved shape as the selectable graphical element is being continuously selected, and, as the selectable graphical element is slid along the second elongated curved shape, the second visually distinguishable indicia that fills the second elongated curved shape to one side of the selectable graphical element changes to a third visually distinguishable indicia that is distinct from the second visually distinguishable indicia; and receiving, via the one or more human-machine interface devices, a selection using the selectable graphical element on the second elongated curved shape where a release of the selectable graphical element is detected by the one or more human-machine interface devices.

According to another aspect of the present disclosure, a computer-implemented method of dynamically modifying an electronic user interface downloaded for display on an electronic video display, includes: causing to be displayed on an electronic video display an electronic user interface including a first graphical element and a second graphical element, the first graphical element having a first elongated curved shape following a first generally curved path and being at least partially filled with a first visually distinguishable indicia in a clockwise or anti-clockwise direction along the first generally curved path, wherein an extent of the first visually distinguishable indicia is commensurate with a first score; the second graphical element having a second elongated curved shape following a second generally curved path concentric with the first generally curved path and being at least partially filled with a second visually distinguishable indicia in the other of the clockwise or anti-clockwise direction along the second generally curved path, wherein the first visually distinguishable indicia is visually distinguishable from the second visually distinguishable indicia, and wherein an extent of the second visually distinguishable indicia is commensurate with a second score, the first score being a subset of the second score; causing to be displayed on the electronic user interface a selectable graphical element on the second graphical element, wherein the selectable graphical element is made to appear on the electronic user interface to slide along the first elongated curved shape or the second elongated curved shape as the selectable graphical element is being continuously selected, and, as the selectable graphical element is slid along the first or second elongated curved shape, the first or second visually distinguishable indicia that fills the first or second elongated curved shape to one side of the selectable graphical element changes to a third visually distinguishable indicia that is distinct from the first or second visually distinguishable indicia; and receiving, via a human-machine interface device, a selection using the selectable graphical element corresponding to a release of the selectable graphical element detected by the human-machine interface device.

The second first score can correspond to a maximum reduction of a number that is portrayed on the electronic user interface. The computer-implemented method can further include: in response to the selectable graphical element being slid beyond a first section of the second graphical element, changing at last part of the first visually distinguishable indicia to a fourth visually distinguishable indicia distinct from the first visually distinguishable indicia in a second section of the first graphical element, the second section appearing to enlarge as the selectable graphical element is slid further away from the first section, wherein the first section corresponds to the at least partially filled portion of the second graphical element.

A third section of the second graphical element can be adjacent to the first section of the second graphical element filled with the second visually distinguishable indicia. The third section can be filled with a fifth visually distinguishable indicia distinct from the second visually distinguishable indicia. The first generally curved path and the second generally curved path can share the same loci.

The computer-implemented method can further include changing the second visually distinguishable indicia to another visually distinguishable indicia in response to the second score exceeding a first threshold level. The computer-implemented method can further include changing the another visually distinguishable indicia to a further visually distinguishable indicia in response to the second score exceeding a second threshold level that is higher than the first threshold level. The computer-implemented method can further include changing the first visually distinguishable indicia to another visually distinguishable indicia in response to the second score exceeding a first threshold level. The computer-implemented method can further include increasing the extent of the first visually distinguishable indicia that at least partially fills the first graphical element as the first score increases. The computer-implemented method can further include increasing the extent of the second visually distinguishable indicia that at least partially fills the second graphical element as the first score increases. The computer-implemented method can further include increasing the extent of the second visually distinguishable indicia that at least partially fills the second graphical element as the second score increases.

The computer-implemented method can further include: causing to be displayed on the electronic user interface a second selectable graphical element on the first graphical element, wherein the second selectable graphical element is made to appear on the electronic user interface to slide along the first elongated curved shape as the second selectable graphical element is being continuously selected, and, as the second selectable graphical element is slid along the first elongated curved shape, the first visually distinguishable indicia that fills the first elongated curved shape to one side of the second selectable graphical element changes to a fourth visually distinguishable indicia that is distinct from the first visually distinguishable indicia. The first visually distinguishable indicia or the second visually distinguishable indicia can include any one or more of a solid color, a color pattern, an animation, a graphic, or text. The first generally curved path can follow a circle, and the second generally curved path can follow another circle.

The human-machine interface device can include a touchscreen, a stylus, a computer mouse, or a gesture sensing device configured to sense a human-made gesture. The electronic video display can be incorporated into a tablet computer, a laptop computer, a personal computer, a smartphone device, or a wearable electronic device.

According to yet another aspect of the present disclosure, one or more computer-readable, non-transitory, storage media encoding machine-readable instructions that when executed by one or more electronic computers cause operations to be carried out is disclosed. The operations include: determining a point value for each of a plurality of online actions made by a user associated with an electronic user account; storing a plurality of merchant-specific scores, each being indicative of the extent of point values accumulated for corresponding ones of the plurality of online actions that are taken with a respective one of a plurality of online merchants and associated with the electronic user account; storing a total score indicative of all point values accumulated for all of the plurality of online actions associated with the electronic user account; providing an electronic user interface that facilitates a negotiation between the user and a selected one of the plurality of online merchants (selected merchant) in which the user requests a discount off an item or service available for online purchase by the selected merchant, where an extent of the discount that the user can request is a function of the merchant-specific score for the selected merchant and the total score, such that the user can request a greater discount the higher the merchant-specific score for the selected merchant or the higher the total score, wherein the negotiation if successful produces a negotiated value; and completing an electronic transaction in which the item or service is purchased by the user at the negotiated value.

Each of the online actions can include (1) making an online purchase from an online merchant, or (2) submitting an online review about a product or service available over the Internet from an online merchant, or (3) sharing, via online social media, information about a product or service available over the Internet, or (4) saving a product or service online for later purchase.

Additional aspects of the present disclosure will be apparent to those of ordinary skill in the art in view of the detailed description of various embodiments, which is made with reference to the drawings, a brief description of which is provided below.

BRIEF DESCRIPTION OF THE DRAWINGS

FIG. 6 is an example composite UI featuring a taxi service and showing auto-filled fields and user-entry fields in the composite UI according to an aspect of the present disclosure.

FIG. 16 is an example UI showing a summary of items shared by the user and the total points for all actions that the user has accumulated according to an aspect of the present disclosure.

DETAILED DESCRIPTION

Figure 1:
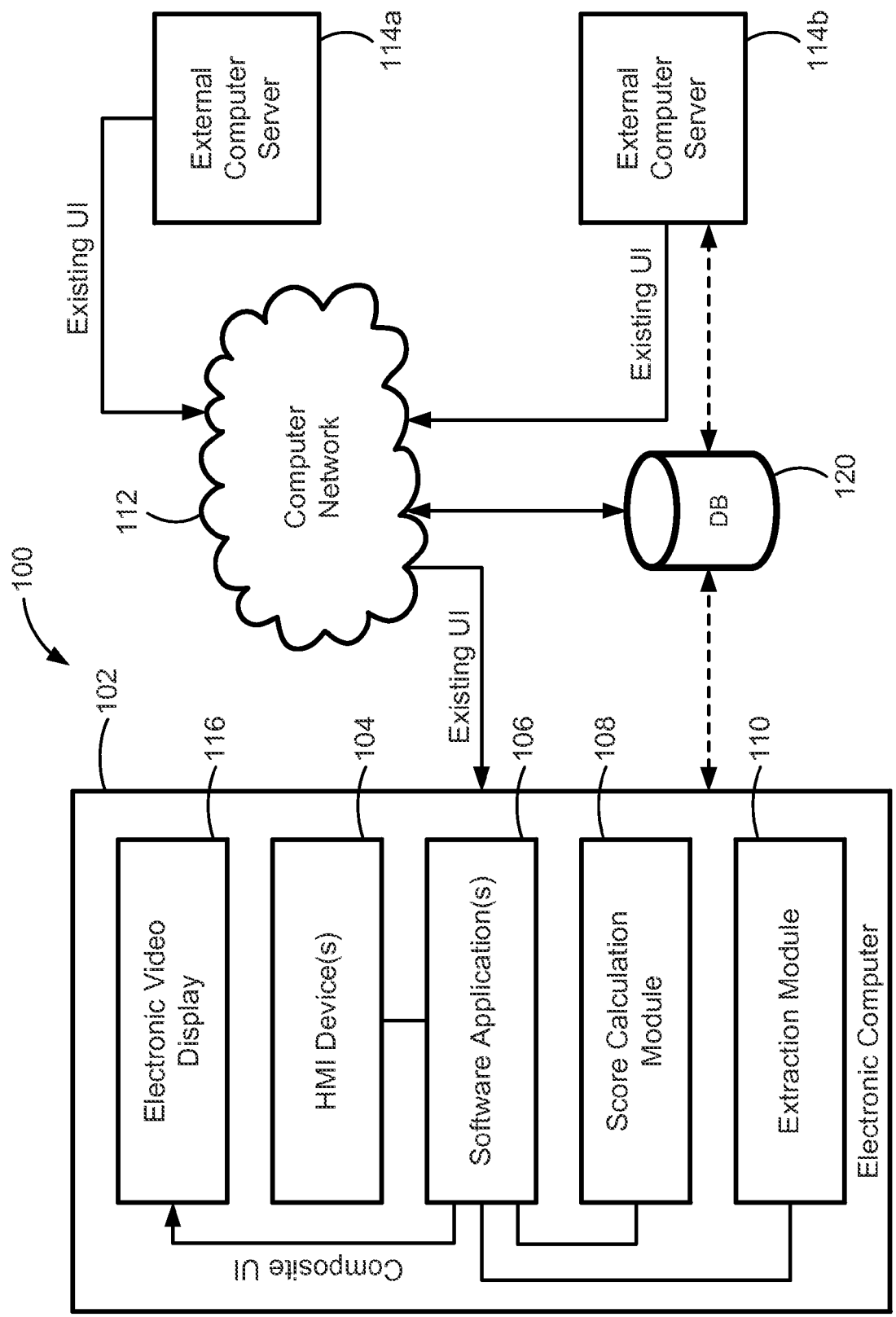
FIG. 1 is a functional block diagram of a computer system according to an aspect of the present disclosure.

While this disclosure is susceptible of embodiment in many different forms, there is shown in the drawings and will herein be described in detail example implementations of the inventions and concepts herein with the understanding that the present disclosure is to be considered as an exemplification of the principles of the inventions and concepts and is not intended to limit the broad aspect of the disclosed implementations to the examples illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

FIG. 1 is a functional block diagram of a system 100 according to an aspect of the present disclosure. First, the general components of the system 100 will be introduced, followed by examples. The system 100 includes one or more electronic computers (clients) 102, which can be coupled together via a computer network 112, such as the Internet. A computer as used herein includes any one or more electronic devices having a central processing unit (CPU) or controller or microprocessor or microcontroller as understood by those skilled in the art of electronic computers. Examples of computers include tablet computers, laptop computers, desktop or personal computers, servers, smartphones, a wearable electronic device such as a watch, an eyeglass, an article of clothing, or a wristband, and personal digital assistants (PDAs). The term computer as used herein can include a system of electronic devices coupled together to form what is conventionally referred to as a computer. For example, one or more input devices, such as a keyboard or a mouse, and one or more electronic display devices, such as a video display, can be coupled to a housing that houses the CPU or controller. Or, all components of the computer can be integrated into a single housing, such as in the case of a tablet computer or a smartphone. The one or more computers 102 conventionally include or are operatively coupled to one or more memory devices that store digital information therein, including non-transitory machine-readable instructions and data. The computer 102 includes one or more electronic human-machine interface (HMI) devices 104, which corresponds to a human-machine interface that accepts inputs made by a human (e.g., via touch, click, gesture, or voice) and converts those inputs into corresponding electronic signals. Examples of HMI devices include a touchscreen, a stylus, a computer mouse, a gesture sensing device configured to sense a human-made gesture, a keyboard, a mouse, a camera, or a microphone. The computer 102 also includes one or more software applications 106, and one more electronic video display devices 116 configured to display information that can be visually or aurally perceived. Examples of display devices include a video display, a stereoscopic display, or any electronic display capable of visually portraying information including text, static graphics, and moving animations that is perceivable by the human eye. The video display devices 116 display visual information contained in an electronic user interface (UI), which can be downloaded to the computer 102 over the computer network 112 from one or more external computer servers 114a, 114b. The electronic user interface can also include selectable elements that are selectable using the one or more HMI devices 104. Thus, the electronic user interface generally can include a graphical user interface (GUI) component and a human-machine user interface component, via which a human user can select selectable elements displayed on the GUI via the HMI interface.

A computer system that includes an electronic database 120 is communicatively coupled to the computer 102 either directly or through the computer network 112. In the example shown, the electronic database 120 is coupled to the computer 102 through the computer network 112, but it can also be coupled through another computer network or through one of the external computer servers 114a,b, such as through an application program interface (API) as that term is understood in the computer and software programming arts. The reference number 120 refers to an electronic computer, such as a server, that includes or is communicatively coupled to a database that stores information in accordance with aspects of the present disclosure. The database 120 can be incorporated into the computer 102. The modules and components shown in FIG. 1 show an exemplary configuration, but those skilled in the art will appreciate that other configurations can be used to carry out the aspects of the present disclosure. The particular configurations of the modules and components are not pertinent to these aspects.

A (software) module can refer to computer-readable object code that executes a software sub-routine or program, which corresponds to instructions executed by any microprocessor or microprocessing device to perform described functions, acts, or steps. Any of the methods or algorithms or functions described herein can include non-transitory machine or computer-readable instructions for execution by: (a) an electronic processor, (b) an electronic controller, and/or (c) any other suitable electronic processing device. Any algorithm, software module, software component, software program, routine, sub-routine, or software application, or method disclosed herein can be embodied as a computer program product having one or more non-transitory tangible medium or media, such as, for example, a flash memory, a CD-ROM, a floppy disk, a hard drive, a digital versatile disk (DVD), or other electronic memory devices, but persons of ordinary skill in the art will readily appreciate that the entire algorithm and/or parts thereof could alternatively be executed by a device other than an electronic controller and/or embodied in firmware or dedicated hardware in a well-known manner (e.g., it may be implemented by an application specific integrated circuit (ASIC), a programmable logic device (PLD), a field programmable logic device (FPLD), discrete logic, etc.).

Two external computer servers 114a,b are shown in FIG. 1, but of course there can be many more coupled to the computer network 112 in the computer system 100. A reference number without a letter can refer to either or both items to which it refers. Thus, the reference number 114 can refer to the computer server 114 a or the computer server 114b or both the computer servers 114a and 114b. The term "external" means that the computer server 114 is external to the computer 102, e.g., housed in a separate housing and a physical distance from the computer 102, or it can refer to being operated or owned by an owner or operator different from an owner or operator of the computer 102 and/or the electronic database 120. For convenience, when referring to the "database 120" herein, it is understood as described above that the database 120 can include or be coupled to an electronic computer, such as a server, which is owned or operated by a different owner or operator from the owner of operator of the external computer servers 114.

A very basic flow involving an electronic user interface is shown in FIG. 1, but described in more detail in later figures. However, for the sake of introducing these concepts, an existing user interface (UI) can be conventionally requested by the software application 106 associated with the computer 102. The software application 106 can be a web browser, or a standalone software application that is operable to access the computer network 112 and to make requests from and send information to the external computer server 114. For example, the standalone software application can be an "app" as that term is popularly known that runs on a smartphone or tablet device. For convenience and ease of discussion, the software application 106 will be assumed to be a web browser, but of course the present disclosure is not limited to use of a web browser. The web browser 106 requests from an external computer server 114 that an existing UI be downloaded to the computer 102. The term "existing" means that the UI has not yet been modified by the aspects of the present disclosure. The owner or operator of the external computer server 114 has already created and stored the existing UI and made it available for download, such as over the Internet 112, in response to requests from client devices, such as the computer 102. Thus, another term to use for "existing" is unmodified in the sense that the UI is downloaded in an unmodified form from the external computer server 114 through the computer network 112 to a conventional communications interface of the computer 102.

The existing UI is downloaded from the computer server 114 to the computer 102 and is interpreted by the web browser 106, which would conventionally cause any graphical objects defined in the UI to be displayed on the electronic video display 116. However, broadly speaking, the existing UI is modified by the present disclosure to produce a composite UI that is displayed on the electronic video display 116. To do so, the same software application 106 or another software application, such as a web browser extension, interacts with a score calculation module 108 and an extraction module 110 to add graphical and optionally selectable elements to the existing UI or to supplement the existing UI with additional graphical and optionally selectable elements. It is important to emphasize that although the score calculation module and the extraction module are shown in the computer 102, as previously emphasized, FIG. 1 is a functional diagram and these modules can be associated with the computer server that is operably coupled or incorporates the database 120. The modules 108, 110 are shown associated with the computer 102 for convenience because they interact with the software application(s) executed by the computer 102, but their physical location is not pertinent to the present disclosure. The details of the score calculation module 108 and the extraction module 110 are explained in more detail in connection with later figures.

Figure 2:
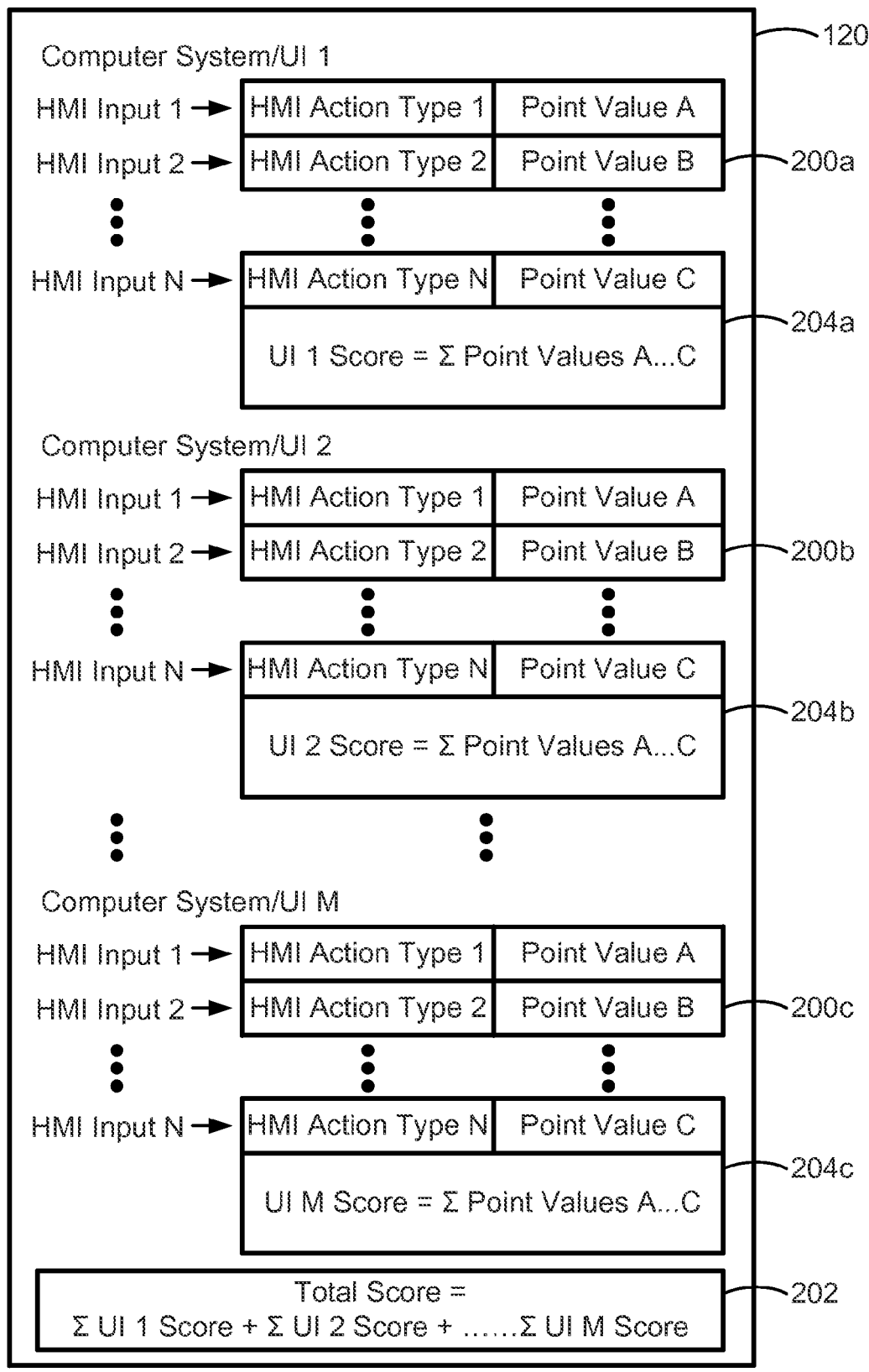
FIG. 2 is a database of scores according to an aspect of the present disclosure.

FIG. 2 are example tables or data structures that can be present or organized in the database 120. In this example, there are M integer number of computer systems, which correspond to the external computer server 114. Each of the computer systems 1, 2, . . . M has at least one existing UI associated therewith. The HMI input is received from the HMI device(s) 104 associated with the computer 102. A human user takes some intentional action that is detected by the HMI device 104 (e.g., touchscreen, mouse, keyboard, video camera, microphone, gesture or movement sensor, etc.) and converted to one or more electronic signals indicative of the action. In this example of FIG. 2, the database 120 characterizes the type of action being taken from the HMI input. To do so, the object in the existing UI being selected is analyzed to determine what type of action is being carried out by the user. For example, as described below, action types can include the user making a purchase of a product or service through the existing UI, submitting a review or rating of a product or service through the existing UI, submitting a referral to refer another user to the existing UI or to a product or service offered by the existing UI, saving a product or service in a wish list (as that term and similar terms are understood in the e-commerce environment) for future purchase, or sharing a product or service featured on an existing UI with another user. In the tables 200 shown in FIG. 2, there are N integer number of types of actions that can be recognized from the HMI input. Associated with each HMI action type is a point value. In the tables shown, there is a point value associated with each of the N types of HMI actions. The point values can be mutually distinct from one another, they can be variable, or two or more of the point values can have the same value. In this example, the user has interacted with M number of different existing UIs and taken every possible type of N number of HMI actions on each of the existing UIs using the one or more HMI devices 104. The database 120 also stores, with each of the tables 200, a corresponding score that is specific to each existing UI. The UI-specific score includes the sum of all of the point values accumulated by the user with the corresponding existing UI. Thus, the UI-specific score 204a includes the sum of all the point values accumulated by the user, subject to any deductions of points that may have occurred as described below. Essentially, the database 120 tracks for each existing UI that the user has interacted with, a running tally of points accumulated by the user for the existing UI, subject to point deductions that may occur from time to time, as described below. For example, the user may sacrifice some points to obtain a steeper discount on a product or service purchased from an owner or operator of an existing UI. The user's purchasing "clout" is a function of at least the number of points accumulated and optionally the frequency with which the user interacts with a particular existing UI, so when the user exceeds the purchasing clout, one or more points can be sacrificed as a function of a level has achieved as a function of the number of points the user has accumulated. The more points accumulated, the more purchasing clout the user has, allowing the user to request steeper discounts without sacrificing points. This can incentivize the user to interact more frequently with a particular existing UI to accumulate more points with a favored owner or operator of the UI. In this way, aspects of the present disclosure can minimize "bargain hunting" where users visit multiple UIs multiple times to try to find the best deal. A technical advantage is that network congestion can be reduced by encouraging users to interact with those existing UIs that the user is particularly loyal to or has a particular affinity with.

Without limiting the present disclosure, the following table illustrates examples of how many points can be assigned to each action type:

TABLE 1

| Example HMI Action on an Existing UI | Exemplary Number of Points Awarded |
|---|---|
| User refers another user to the existing UI or an item featured on the existing UI | +1 point for each referral or +1 points for each $10 spent by the other user |
| User saves an item on an existing UI in a wish list | +1 point for each item saved |
| User shares with another user or other users an item featured on an existing UI | +5 points for each share action |
| User purchases an item (product, service) featured on an existing UI | +1 point for each $1 spent purchasing the item |
| User rates or reviews an item featured on an existing UI | +10 points for each review |

The database 120 also stores and keeps track of a total score 202, which is the sum of all the UI-specific scores 204a,b,c. The total score 202 is a metric of the user's overall clout. There is a similar table for every user. Only one is shown here, but a user can be identified through a user account that the user accesses, such as with conventional login credentials, to confirm the user's identity and authorization to have the user's actions tracked. In this way, the user is in control of which activities are tracked. Many online users have a disinclination to allow owners or operators of websites to track their activities. The present disclosure puts that power in the hands of the user so that the user decides which actions are tracked, but not by the owner or operator of the UIs the user visits, but rather by a third party owner or operator that the user trusts. To consent to be tracked, the user can install and run a browser extension that integrally works with a web browser that downloads the existing UI, or the user can install and run an app on a smartphone or tablet, which can be a browser or other customized app with browser capabilities. Tracking can be turned on or off by the user through the browser extension or app. When turned on, the database 120 keeps track of the user's actions, characterizes the type of each action, assigns the corresponding point value to each type of action, tallies the specific UI scores, and keeps a running tally of the user's total score across all UIs.

Figure 3:
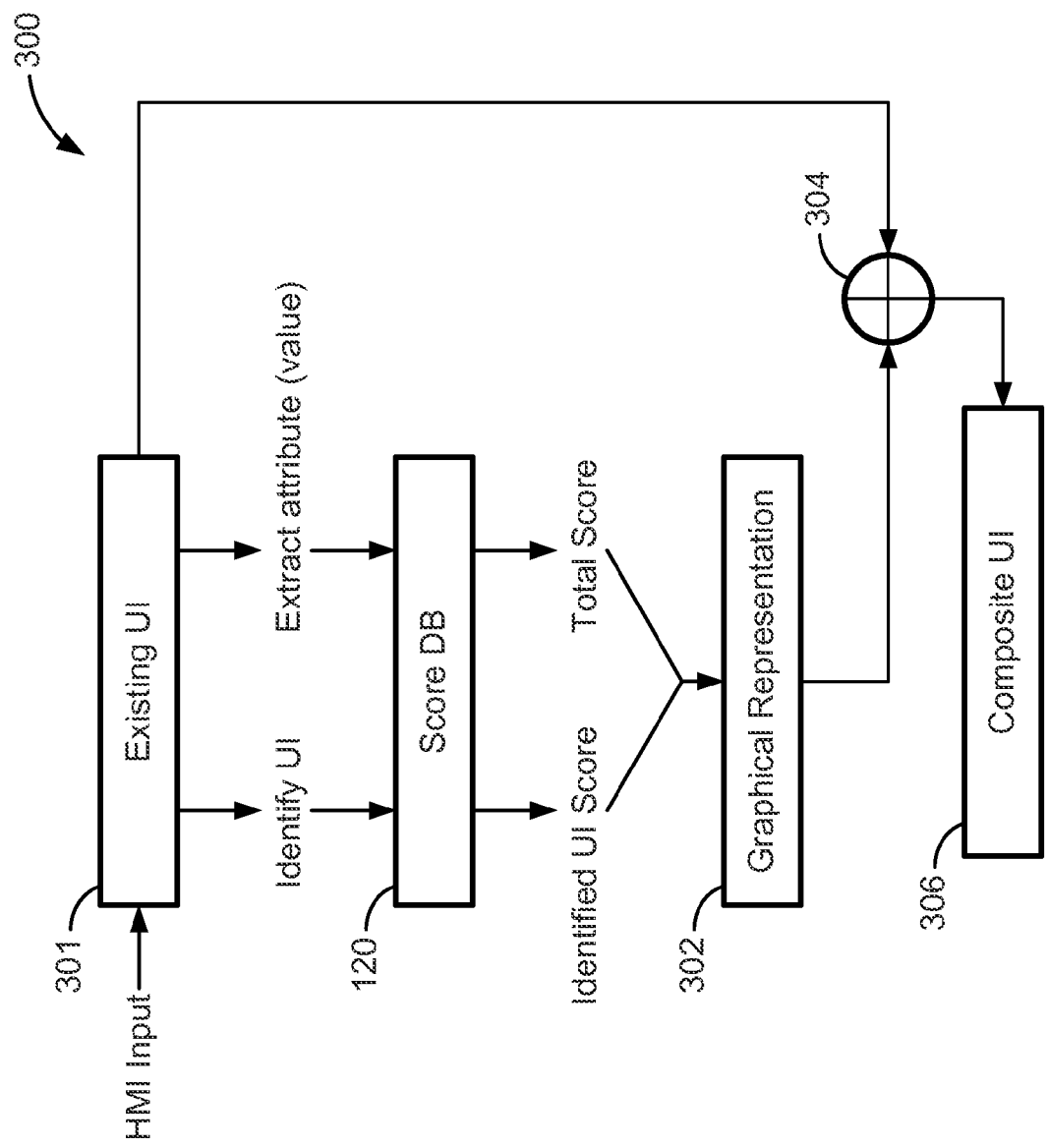
FIG. 3 is a flow diagram showing how an existing user interface (UI) is combined with scores from the database shown in FIG. 2 to produce a composite UI according to an aspect of the present disclosure.

FIG. 3 is an example flow diagram 300 showing how a composite UI is generated according to aspects of the present disclosure. Here, the user may have previously visited various existing UIs, racking up points along the way. The purpose of this example is to show one way that the user's activity can be tracked and categorized when the user downloads and takes action on a particular UI. These functions or steps can be carried out by the computer 102 and/or the computer server associated with the database 120. An HMI input is received that is indicative of an action taken by the user relative to an existing UI 301. The action can include making a selection of a selectable element on the UI 301, or uploading information entered by the user to the UI 301, such as text corresponding to a review of a product or service offered by the owner or operator of the existing UI 301. The extraction module 110 extracts information from the existing UI 301 to identify the owner or operator of the UI 301 and at least one attribute of an item featured on the UI 301. For example, if the UI appears in the form of a web page, the identity of the owner or operator of the UI 301 can be extracted from at least a portion of the uniform resource locator (URL) corresponding to the web page. The attribute can be an attribute of an item, such as a product or service, offered for purchase on the existing UI, such as a price or value of the item, an image of the item, a quantity of a desired number of the items, a size of the item, a color of the item, or an expiration of the item. The extraction module 110 can also optionally characterize a type of the action made from the HMI input, if the user is taking an action for which points can be accrued. However, in this basic example, the identified UI is used by the extraction module 110 to determine which UI-specific score to use from the table stored in the database 120, an example of which is shown in FIG. 2. The score calculation module 108 can add points, if applicable, to the UI-specific score 204 corresponding to the identified UI and update the total score 202. The score calculation module 108 returns at least the UI-specific score 204 corresponding to the existing UI 301 and the total score 202 from the database 120. At least these two scores, and optionally the extracted attribute(s), are used to generate dynamically a graphical representation 302 that features a first graphical element representing the identified interface-specific score 204 corresponding to the identified UI 301 and a second graphical element representing the total score 202. Example forms of the graphical representation 302 will be described below in more detail. Finally, at step 304, the software application 106 combines the graphical representation 302 with the existing UI 301 to produce a composite UI 306. By "combines," it is meant that the graphical representation 302 can appear as an overlay over a part of the composite UI 306, or adjacent to the existing UI 301. Broadly speaking, both the graphical representation 302 and at least part of the existing UI 301 are displayed on the electronic video display 116 simultaneously so that the graphical representation 302 and at least part of the existing UI 301 can be viewed on the same screen or window on the video display 116. The particular arrangement of the graphical representation 302 relative to at least part or all of the existing UI 301 is not pertinent to certain aspects of the present disclosure. The composite UI 306 includes and is viewable on the display device 116 at least part of the existing UI 301 and the UI-specific score for the existing UI 301 and the total score associated with an account of the user accessing the existing UI 301.

Figure 4:
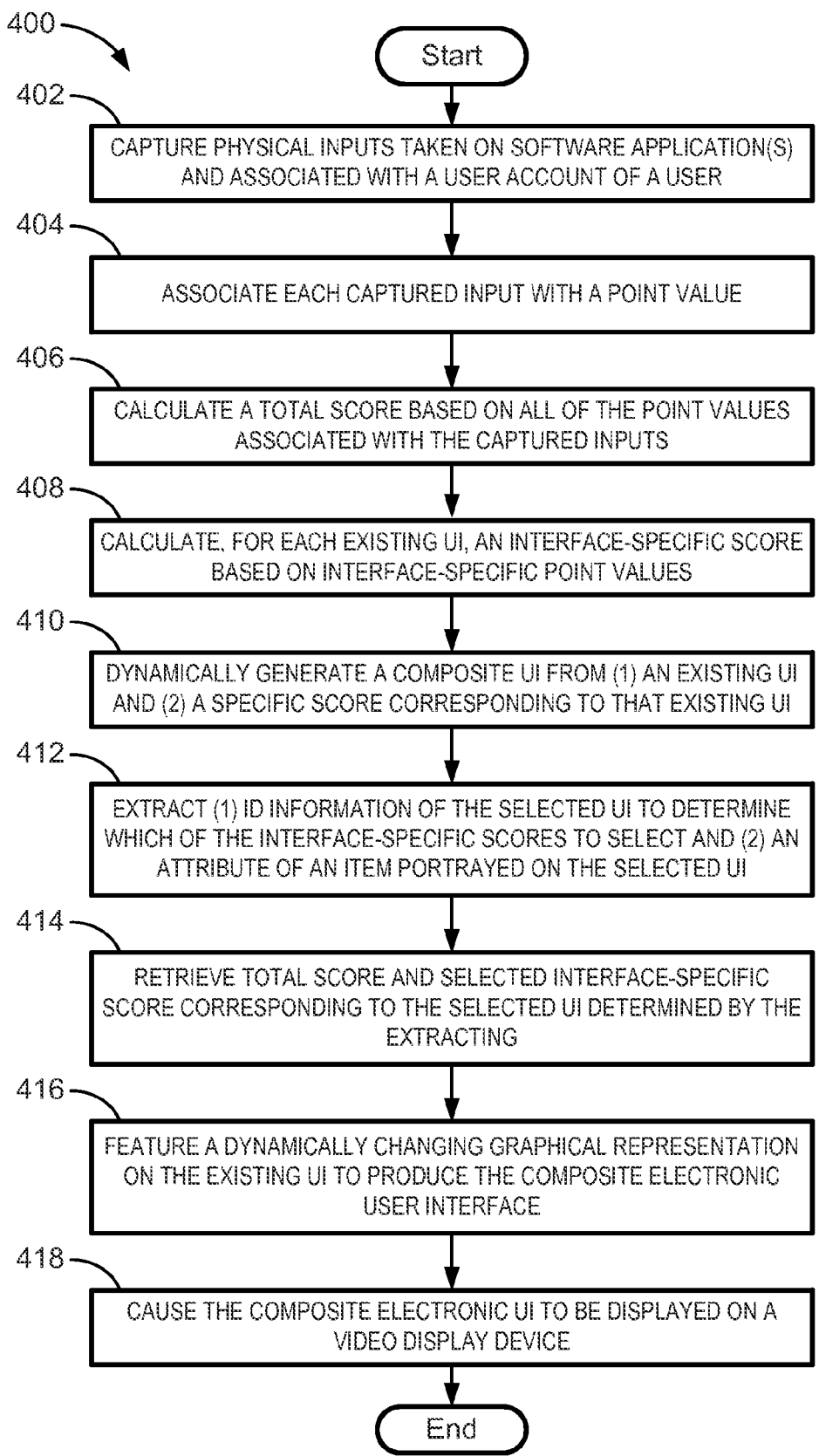
FIG. 4 is a flowchart illustrating how the composite UI produced in FIG. 3 is generated according to an aspect of the present disclosure.

FIG. 4 is a flowchart of a computer-implemented method or algorithm 400 of dynamically modifying an electronic user interface downloaded for display on one or more electronic video displays, such as the display 116, using aspects of the present disclosure including the computer system 100, database 120, and flow diagram 300. The algorithm 400 captures, using an electronic computer such as the computer 102, physical HMI inputs made via one or more human-machine interface devices, such as the HMI devices 104 (402). Each of the physical HMI inputs is indicative of a human-machine action taken on one or more software applications 106 and is associated with an electronic user account of a human user (402). The human-machine action includes receiving an electronic representation of a physical input of a selectable element on an electronic user interface, such as the UI 301, featuring one or more items. The electronic user account includes a name of the human user. The items can be a product or service offered on the existing UI 301.

The algorithm 400 associates, using the computer 102, each of the inputs with a corresponding point value, such as shown in the table 200 in FIG. 2 (404). An extent of the point value is a function of at least a type of the respective human-machine action associated with the respective one of the inputs, again such as shown and described in connection with FIG. 2. Different point values are associated with different types of human-machine actions.

The algorithm calculates, using the computer 102, a total score 202 based on all of the corresponding point values associated with the physical inputs (406). The algorithm 400 calculates, using the computer 102, for each of multiple existing electronic user interfaces, such as the UI 301, an interface-specific score 204 that is based on at least some of the point values associated with the corresponding one of the existing electronic user interfaces (408). The algorithm 400 dynamically generates, using the computer 102, a composite electronic user interface 306 from at least (1) a selected one of the existing electronic user interfaces 301 downloaded from an external computer server 114 over the computer network 112 and (2) the UI-specific score 204 corresponding to the selected UI 301 (410). To dynamically generate the composite UI 306, the algorithm 400 extracts, from the selected user interface 301 or the external computer server 114, at least identification information of the selected user interface 301 to determine which of the interface-specific scores 204 to select (412). The algorithm 400 can optionally also extract, from the selected user interface 301 or the external computer server 114, an attribute of an item portrayed on the selected user interface 301. The attribute, as explained in connection with FIG. 3 can include a number indicative of a value of the item, which can be a product or service, for example.

To dynamically generate the composite UI 306, the algorithm 400 retrieves, using the computer 102, the total score 202 and the selected UI-specific score 204 that corresponds to the selected user interface 301 determined by the extracting in block 412 (414). The algorithm 400 features a dynamically changing graphical representation 302 with the existing electronic user interface 301. The dynamically changing graphical representation 302 features a first graphical element representing the selected UI-specific score 204 corresponding to the selected user interface 301 and a second graphical element representing the total score 202, to produce the composite UI 306 that includes at least a portion of the existing electronic UI 301 and the dynamically changing graphical representation 302 (416). The algorithm 400 causes the composite electronic UI 306 to be displayed on one of the electronic video display device(s) (418).

The following figures use any of the aspects described above in connection with the foregoing FIGS. 1-4. These figures and accompanying description lay out some of the foundational aspects of the present disclosure, which the following figures show as mere exemplars of the many implementations contemplated by the present disclosure.

Figure 5:
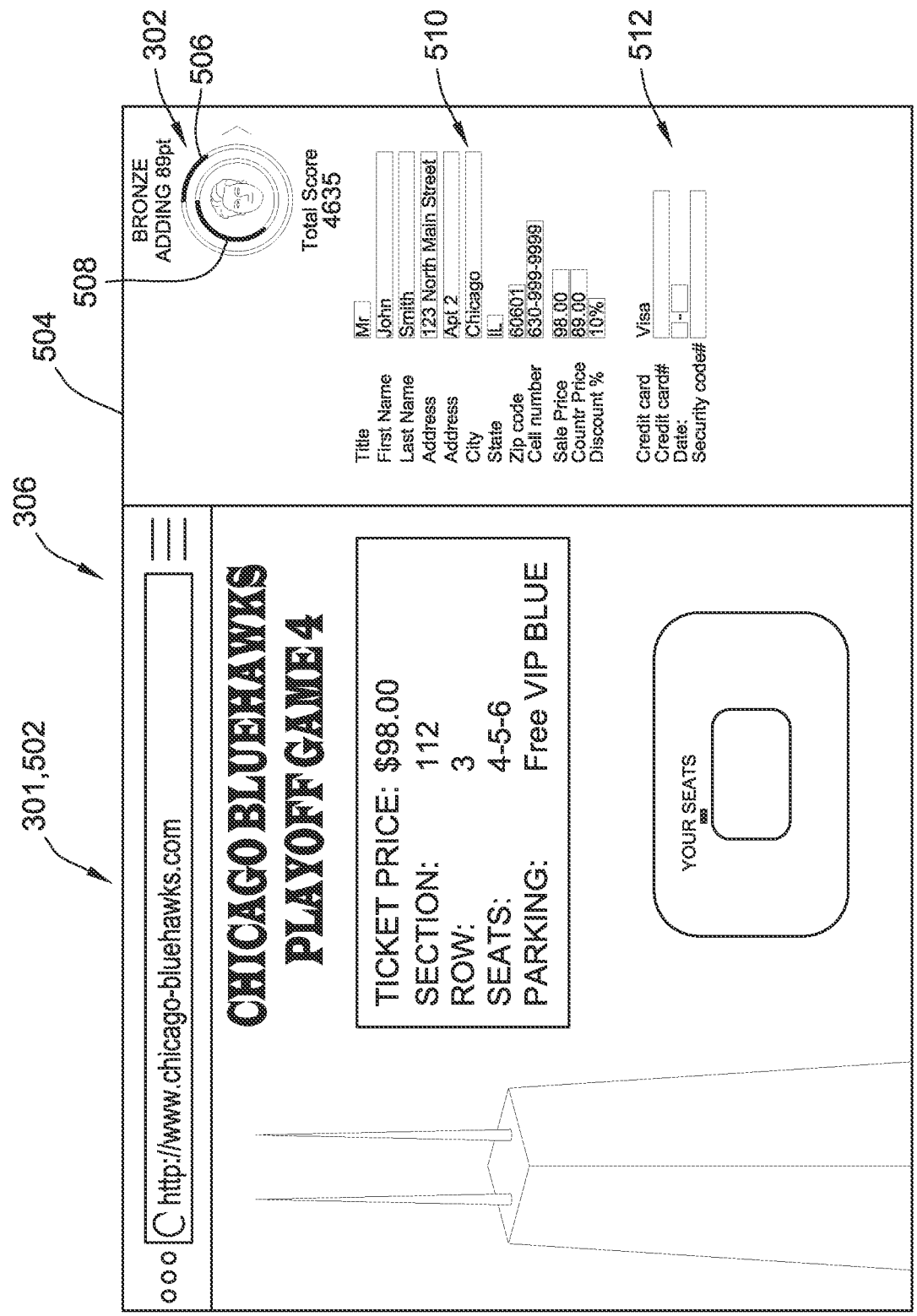
FIG. 5 is an example composite UI featuring tickets for purchase and showing a graphical representation of two score meters according to an aspect of the present disclosure.

FIG. 5 illustrates an example composite UI 306 that includes an existing UI 301, 502 and a frame 504 that includes the graphical representation 302, depicted here as including an avatar with two concentric circles surrounding a photo or rendering of the human user or a likeness thereof. The graphical representation 302 is not initially part of the existing UI 301, 502, but now appears on the same screen or window on the video display 116 as the existing UI 301, 502. The graphical representation 302 includes a first graphical element 508 and a second graphical element 506. The first graphical element 508 has a first elongated curved shape following a first generally curved path and is at least partially filled with a first visually distinguishable indicia in an anti-clockwise direction along the first generally curved path. An extent of the first visually distinguishable indicia 508 is commensurate with the UI-specific score 204. "Visually distinguishable indicia" as used herein can refer to any indicia that can be displayed on the video display 116 that meets the criteria above (having an elongated curved shape following a generally curved path and at least partially filling a first graphical element), such as, for example, a solid color, a color pattern, an animation, a graphic, text, or any combination of the foregoing. For ease of discussion, assume that the visually distinguishable indicia refers to different colors, but of course they need not be so limited. Also, the color in the first graphical element 508 need not fill in an anti-clockwise direction but alternately can fill in a clockwise direction.

The second graphical element 506 has a second elongated curved shape following a second generally curved path concentric with the first generally curved path and is at least partially filled with a second visually distinguishable indicia in the clockwise (or anti-clockwise) direction along the second generally curved path. The first generally curved path and the second generally curved path can share a common loci. The first visually distinguishable indicia is visually distinguishable from the second visually distinguishable indicia, meaning, for example, they have different colors, color patterns, etc. and are otherwise visually distinguishable from one another as displayed on the video display 116. An extent of the second visually distinguishable indicia is commensurate with the total score 202, the UI-specific score 204 being a subset of the total score 202. The "extent" of the color refers to how much of the graphical element 506, 508 is filled in with the color. The graphical elements 506, 508 visually resemble a circular-shaped meter that is filled in gradually with a color in a clockwise or anti-clockwise direction. In this example, one meter 508 fills in an anti-clockwise direction as the user accumulates points associated with the specific UI 301, while the other meter 506 fills in a clockwise direction. Also shown in the frame or window 504 is indicia indicating a level that the user has achieved based on the total score 202 accumulated. In this example, the starting level is bronze, and as will be described in later figures, the user accumulates more points sufficient to exceed a first level threshold to be upgraded to a second level called silver in this example. The following table illustrates an example of different levels and the (total or UI-specific) points the user needs to accumulate to unlock additional benefits. Although example level names are provided as bronze, silver, etc., the levels can be identified by any other indicia, such as by numbers, e.g., Level 1, Level 2, and so forth.

TABLE 2

| Level | Example Point Range | Example Benefits |
| --- | --- | --- |
| Bronze (Level 1) | 0-4999 | Make an offer between 0-10% off<br>1000 points to share with other users (100 points max per user) |
| Silver (Level 2) | 5000-14,999 | Make an offer between 11-25% off<br>No points lost for offer between 0-10%<br>2000 points to share with users (200 points max per user) |
| Gold (Level 3) | 15,000-99,999 | Make an offer between 26-50% off<br>No points lost for offer between 0-25%<br>4000 points to share with other users (400 points max per user)<br>1% back for every $1 spent when the user influences an actual purchase by another user |
| Platinum (Level 4) | 100,000-199,999 | Make an offer between 51-75% off<br>No points lost for offer between 0-50%<br>10,000 points to share with other users (1000 points max per user)<br>1% back for every $1 spent on every purchase |
| Black (Level 5) | 200,0000-∞ | Make an offer between 51-75% off<br>No points lost for offer between 0-50%<br>50,000 points to share with other users (2000 points max per user)<br>Share personalized deals with up to 1,000 other users<br>>1% back for every $1 spent on every purchase |

As the user accumulates more points, either total points 202 or UI-specific points 204, the user can request higher reductions in the value (e.g., price) of an item (e.g., product or service) offered for purchase on a UI, and starting at the silver level, enjoys a range of reductions for which no points will be lost. As will be explained below, the level of points enjoyed by the user is an indication of that user's purchasing clout, but the user can exceed the clout by asking for a higher reduction in the value at the risk of losing points and even dropping to a lower level. Again, the user is in complete control of how the user accumulates points and how many points the user may be willing to sacrifice to procure a steeper discount off the value of an item.

Returning to FIG. 5, although the level is shown in text as bronze in the example, alternately, the colors selected for the graphical elements 506, 508 can also indicate the level of points the user has achieved. For example, in the silver level, the color of one or both of the graphical elements 506, 508 can be various shades of a gray or silver color, whereas in the gold level, the color of one or both graphical elements 506, 508 can change to a gold or yellow color. The user's current total score 202 is also displayed on the frame 504, which in this example is 4635 points, which is just shy of the 5000 threshold needed to be upgraded from the bronze level to the silver level according to the example table shown above. Here, the user is purchasing items, in this example, tickets to a sports game using an existing UI 301, 502. In the frame 504, the user's identification information extracted from the user account is auto-filled or auto-populated into the fields required by the owner or operator of the existing UI 301 to complete a purchase transaction of the items (tickets) in an auto-filled area 510 on the frame 504. In this example, the user is receiving a 10% discount off the value of the tickets of $98, for a total of $89. The user entry area 512 shown below the auto-filled area 510 includes credit card fields for input by the user to complete the electronic transaction. Thus, the frame 504 includes some auto-filled fields, extracted from the existing UI 301 and auto-populated with information supplied by the user and stored in the user account, and some fields that the user is required to complete. The frame 504 also shows an indication that 89 points will be added to the user's UI-specific and total score 202, 204 upon completion of the purchase of the tickets.

Figure 6:
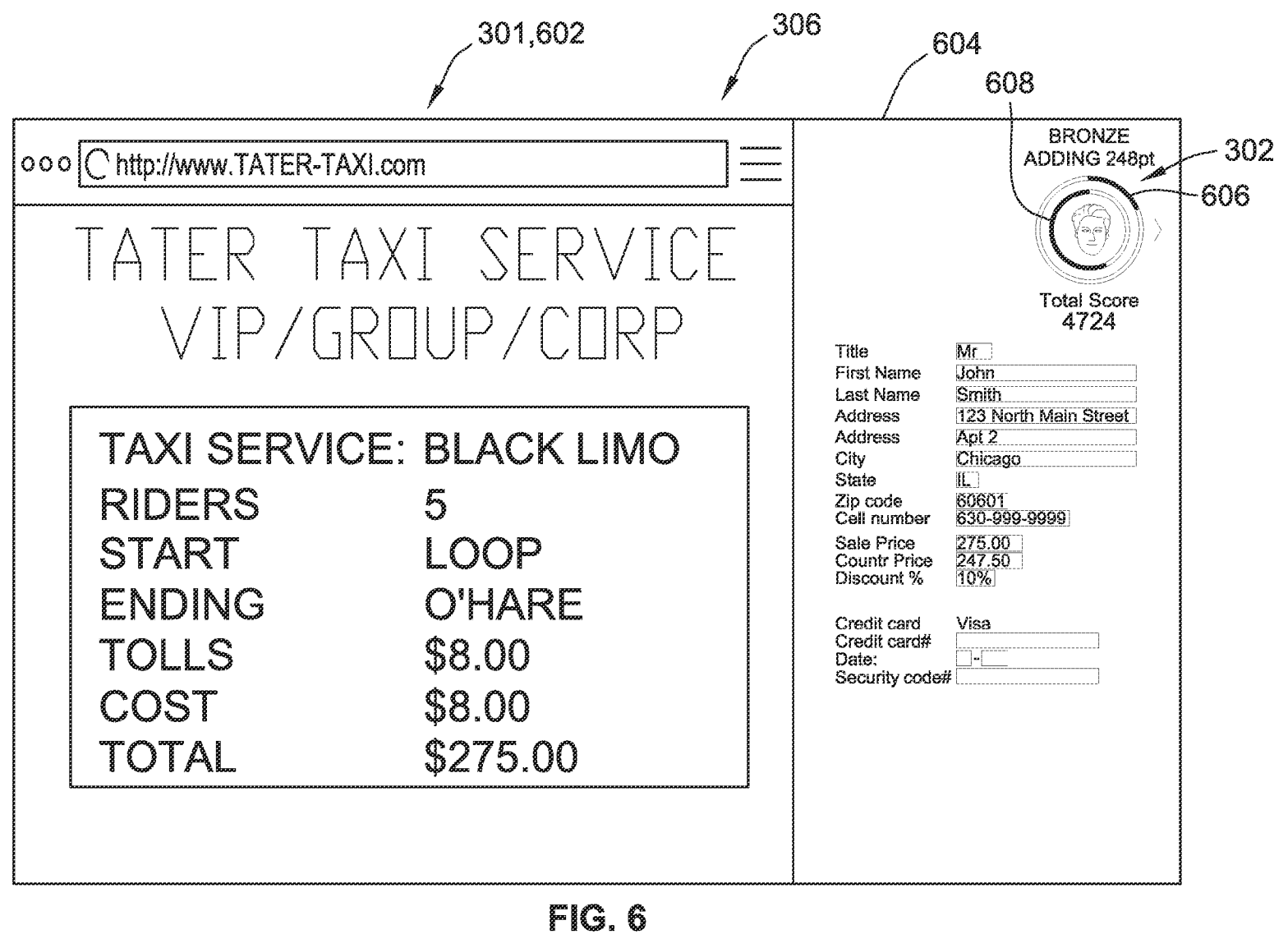

In FIG. 6, the user is now interacting with a different existing UI 602, like the UI 301, and this time the UI offers an item that corresponds to a taxi service. A composite UI 306 is shown that includes the existing UI 301, 602 and a frame or window 604 that includes a graphical representation 302 of the scores 202, 204. In this example, the total score 202 indicated by the second graphical element 606 is slightly more filled in compared to the total score 202 shown by the second graphical element 506 in FIG. 5, because 89 points have been added to the user's total score based on the purchase of the tickets on the UI 502. The color in the second graphical element 606 is added in a clockwise direction. The first graphical element 608 shows the user a visual indication (e.g., a colorized arc) of the number of points accumulated for the owner or operator of the UI that offers the taxi service. Here, the user has taken more actions to use the taxi service on the UI 602 than to purchase tickets on the UI 502. So the UI-specific score 204, represented by the first graphical element 608, is filled in an anti-clockwise direction to a greater extent than the UI-specific score 204 for the first graphical element 508 shown in FIG. 5. The amount that the color fills the circular meter can be commensurate with a maximum total points threshold, or it can be automatically adjusted as a function of all the other UI-specific scores 204. For example, if the UI-specific scores 204 range from 1-1500, but then eventually shift to range from 1000-50,000, the amount (extent) of color that fills the meter 608 can be a function of the maximum UI-specific score 204, which will usually increase as a trend, and a maximum total points threshold, which can be reset each time a new maximum UI-specific score 204 is achieved. The amount (extent) of color that fills the meter 606 can be adjusted in similarly. For example, until the user achieves the highest Black level of points, the maximum number of points threshold for the total score 202 can be set at 200,000. So if the user has 50,000 points, then the meter 606 is filled 25% of the entire circle.

Figure 7:
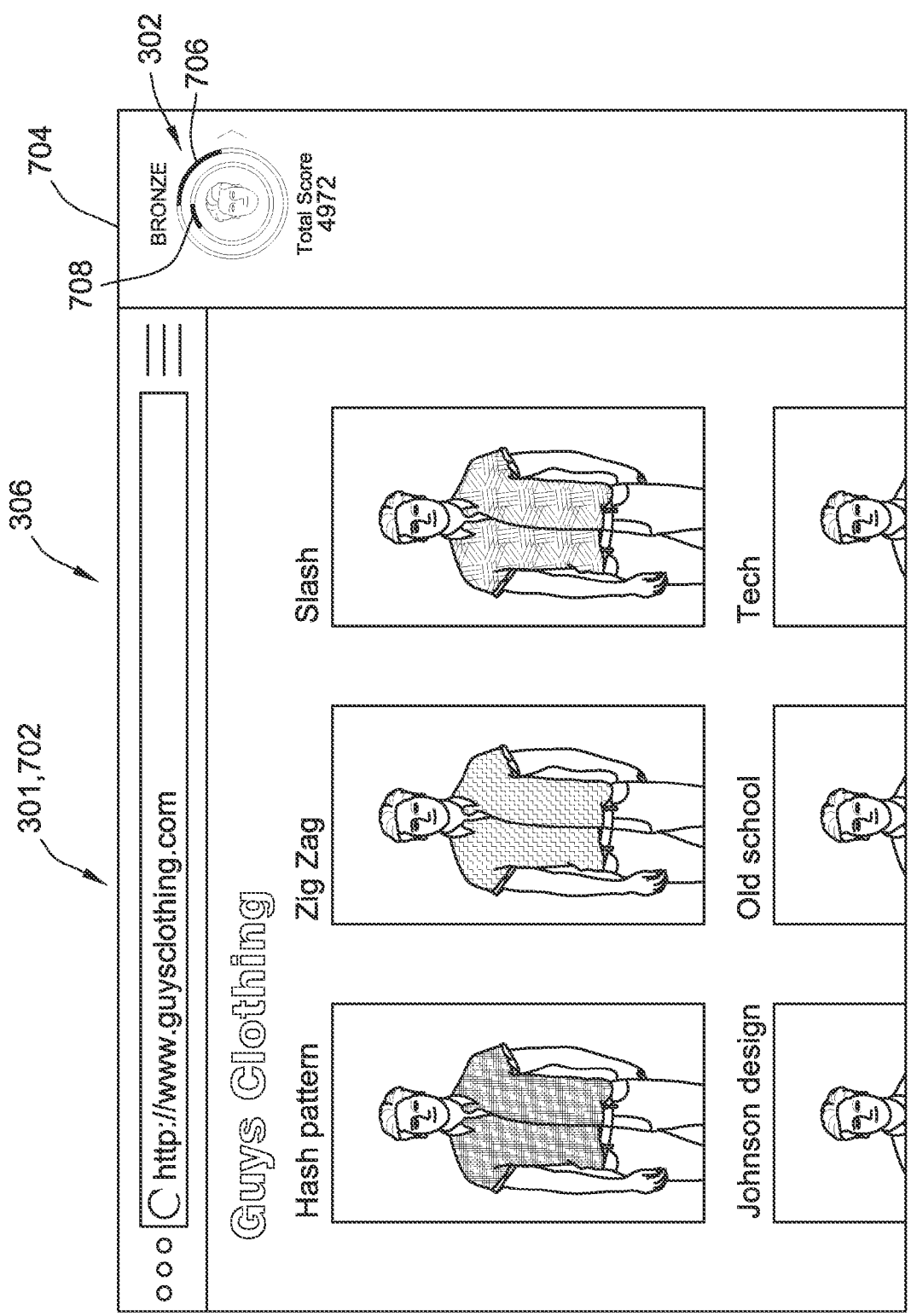
FIG. 7 is an example composite UI featuring clothing items and showing a graphical representation that includes a meter showing the score for this clothing retailer according to an aspect of the present disclosure.

Also displayed in FIG. 6 is an adjusted total score of 4724, which is the sum of 4635 points from FIG. 5 plus the 89 points added through the purchase of the tickets on the UI 502, bringing the new total score 202 to 4724, even closer to the threshold between the bronze and silver levels. Again, these illustrations intend to show how the user can take actions on different existing UIs, such as different websites, and accumulate different UI-specific points that are tallied for each specific UI and displayed on the composite UI 306. One more example is shown in FIG. 7, where a composite UI 306 includes an existing UI 702 that differs from the UI 502 and the UI 602, and a frame or window 704 displaying, simultaneously with the existing UI 702 on the same screen on the video display 116, a graphical representation 302 that includes the UI-specific score 204 for the UI 702 and the user's total score 202. In this example, the graphical representation 302 shows that the UI-specific meter 708 barely fills the entire circle, which means that of the three UIs 502, 602, 702, this user has taken the fewest actions in connection with the UI 702. The total score meter 706 graphically represents the total score of 4972 points, which is also displayed in the frame 704. The color filling the total score meter 706 advances slightly in the clockwise direction from FIG. 6 to FIG. 7 because 248 points were added to the user's total score 202 thanks to the purchase of the taxi service, which was captured by the database 120 and added to the user's total score 202, bringing the user within 38 points of achieving silver level status.

Figure 8:
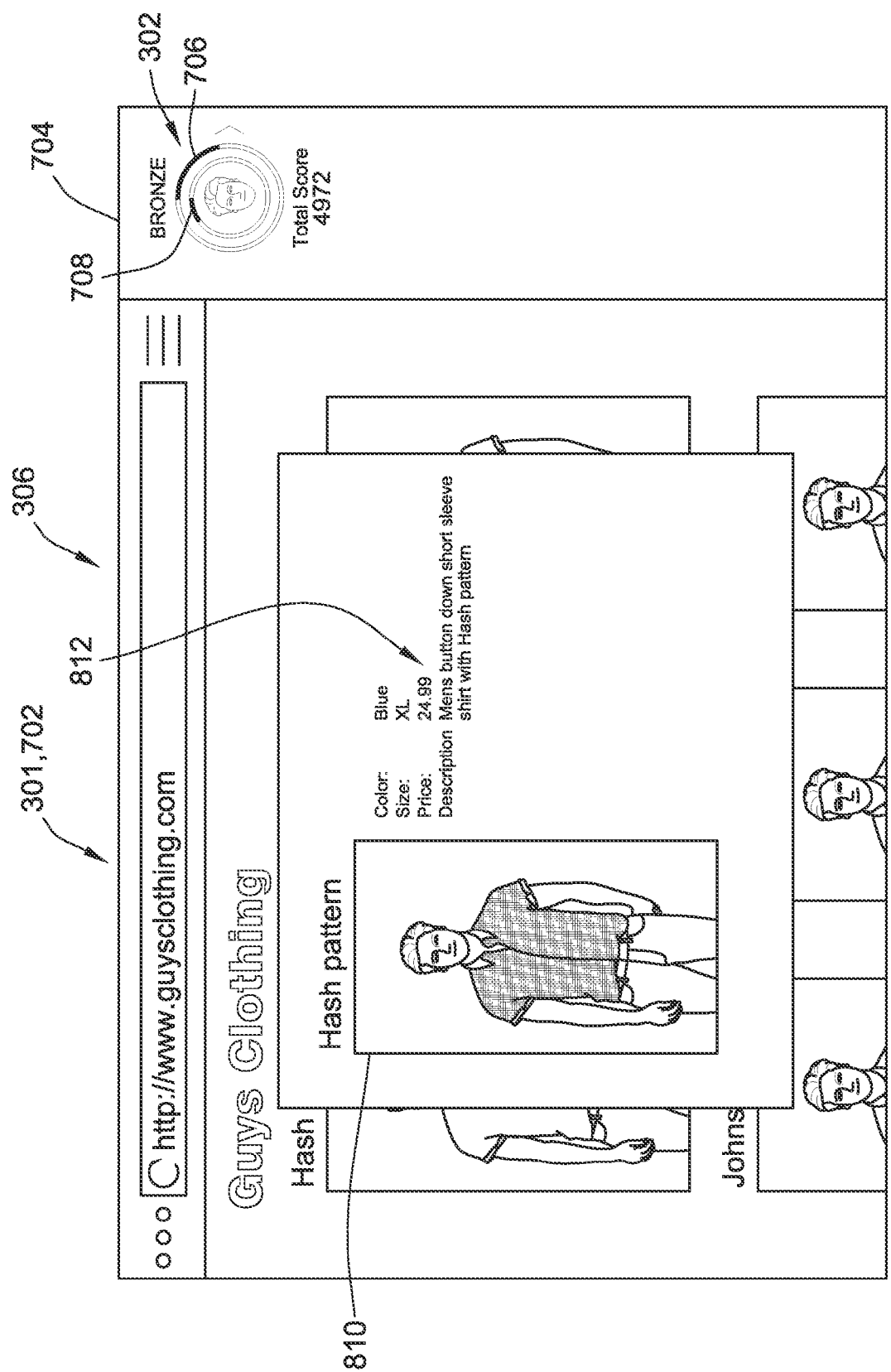
FIG. 8 is an example composite UI featuring a clothing item selected by a user according to an aspect of the present disclosure.
Figure 9:
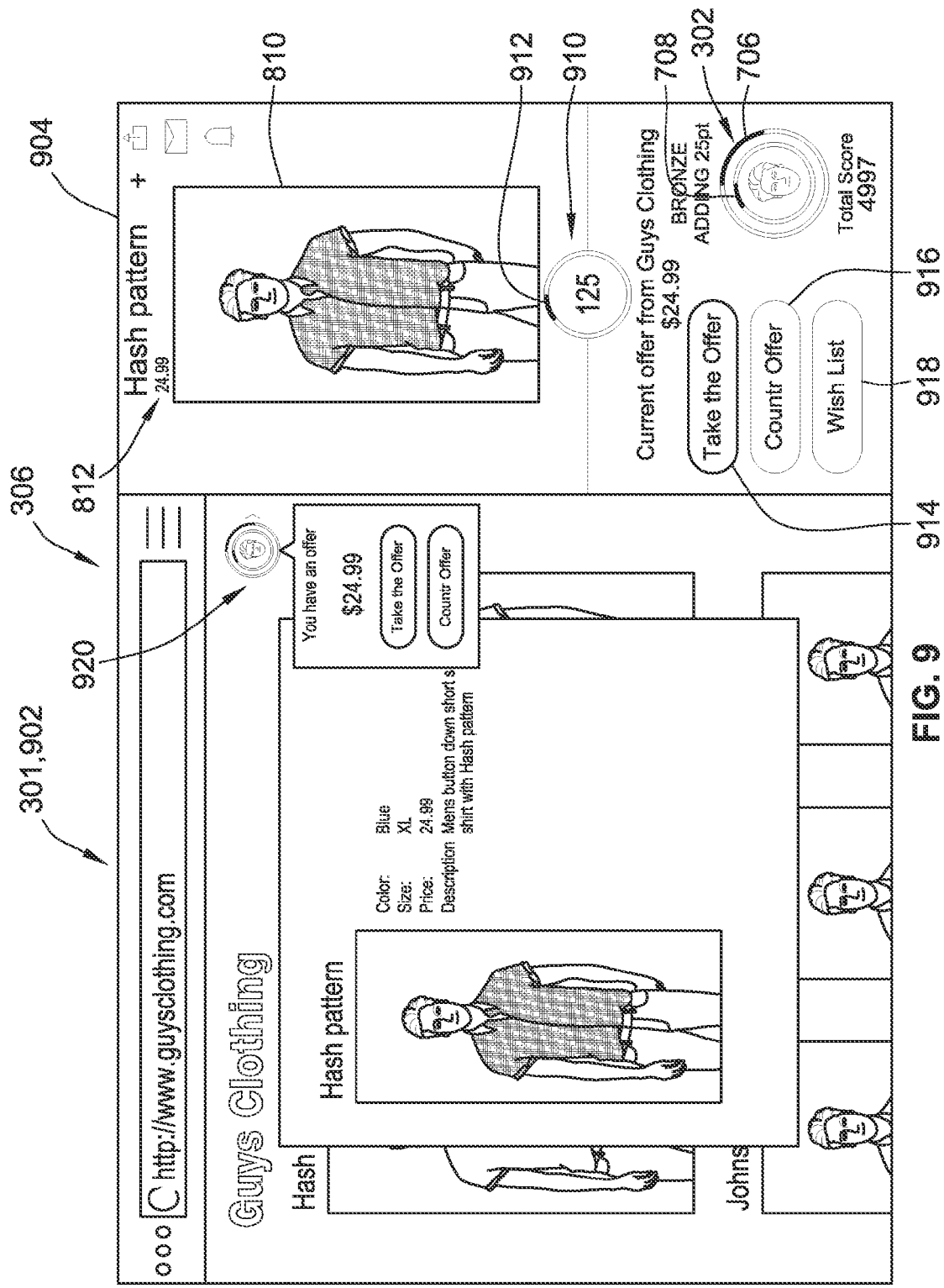
FIG. 9 is an example of the composite UI shown in FIG. 8 showing the user making a purchase of the selected clothing item according to an aspect of the present disclosure.

In FIG. 8, the user has selected an item to purchase on the UI 702, and the computer 102 can extract from the UI 702 at least image of the item 810 and a value (e.g., price) 812 for the item 810. In FIG. 9, the extracted value 812 is now shown on the frame 904 of the composite UI 306, along with the extracted photo of the item 810. A second graphical representation 302, 920 is shown on the UI 902, which allows the user to purchase the item 810 for the price offered by the merchant of the UI 902 or make a counteroffer using the composite UI 306. The frame 904 also displays a meter 910 showing the UI-specific score 912 as a color filling the meter as shown along with the number of points, which in this example is 125. Thus, the user has accumulated 125 points with this UI 902 through various prior actions taken with the owner or operator of this UI 902. The user's UI-specific score 912, and/or the user's level, is commensurate with the extent of a discount or reduction the user can request and realistically be accepted by the merchant of the UI 902. In this example, the item 810 is a shirt product that can be purchased for $24.99 from the owner or operator (e.g., merchant) of the UI 902. The frame 904 displays selectable elements 914, 916, 918, which can be selected by the user using the HMI device 104 to accept the offer (914), make a counter offer (916), or add the item to the user's wish list (918), which if taken would add one point to the user's UI-specific score 204 for the UI 702 and the user's total score 202 (according to the example Table 1 shown above).

Figure 10:
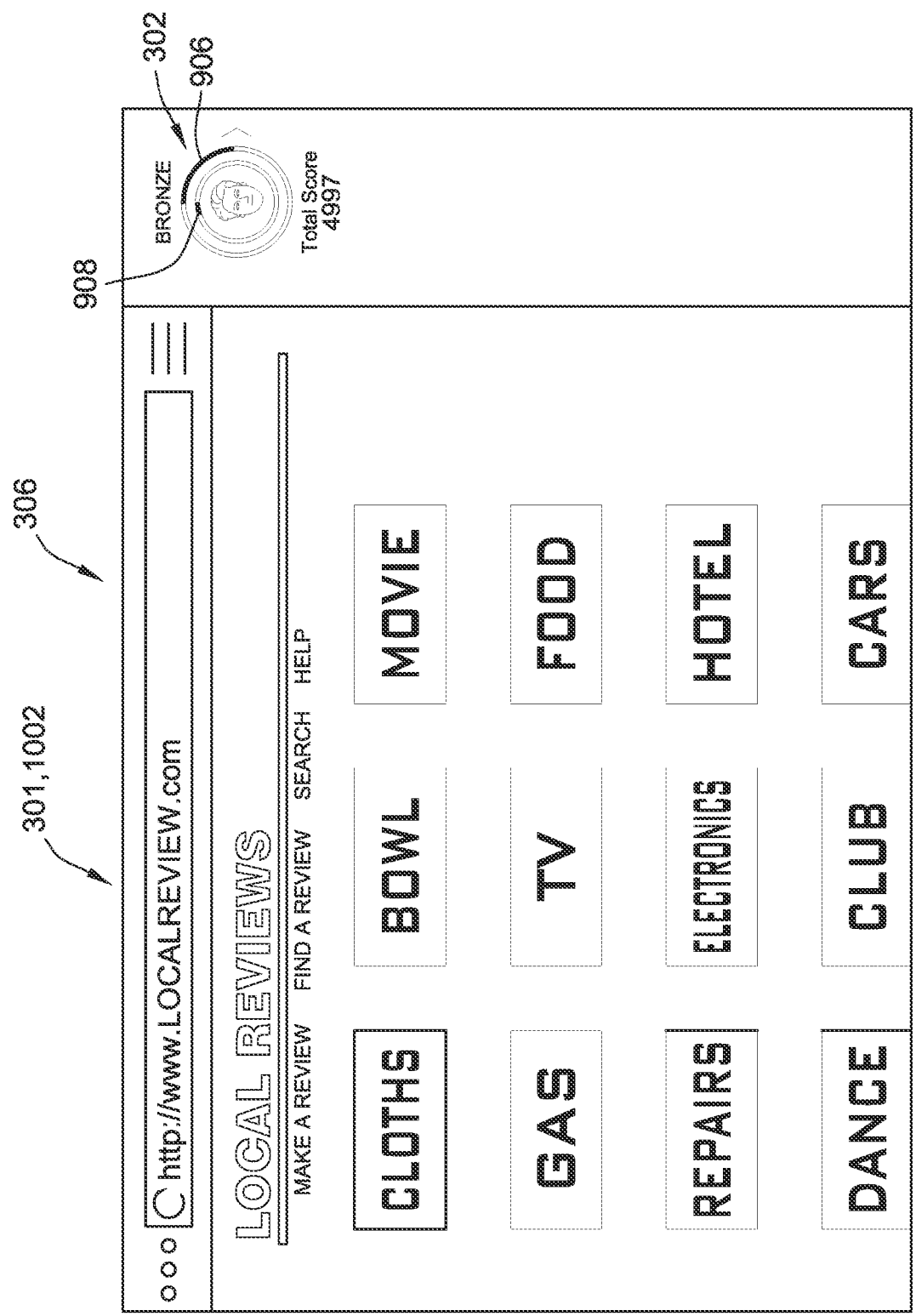
FIG. 10 is an example composite UI featuring items or merchants available for review and showing a graphical representation that includes a meter showing a representation of the number of points accrued by the user at this UI according to an aspect of the present disclosure.

In FIG. 10, the user is taking a different type of action on an existing UI 1002. In FIGS. 5-9, the type of action is a purchase, but in FIG. 10, the user is about to write and submit a review for an item featured on the UI 702. According to the example Table 1 shown above, the user will receive 10 points for submitting a review of an item featured on the UI 702. In this example, the composite UI 306 has extracted a photo of the item 810 from the UI 702 and displayed it on the UI 301, 1102. The user has written a review by inputting text into a text entry object 1112 on the UI 1102 and submitted the review to the website associated with the UI 702. The frame 1104 shows that 10 points have been added to the user's total score 202, bringing the user's total score from 4997 to 5007, which according to Table 2, upgrades the user from the bronze level to the silver level, which is also shown in the frame 1104 of FIG. 11. The color that fills the first graphical element 1108 is advanced slightly in an anti-clockwise direction to indicate that 10 points have been added to the UI-specific score 204 for the UI 702. The color that fills the second graphical element 1106 is also advanced slightly in a clockwise direction to indicate that 10 points have also been added to the total score 202 for the user. The updated total score 202 of 5007 is shown in the frame 1104.

Figure 11:
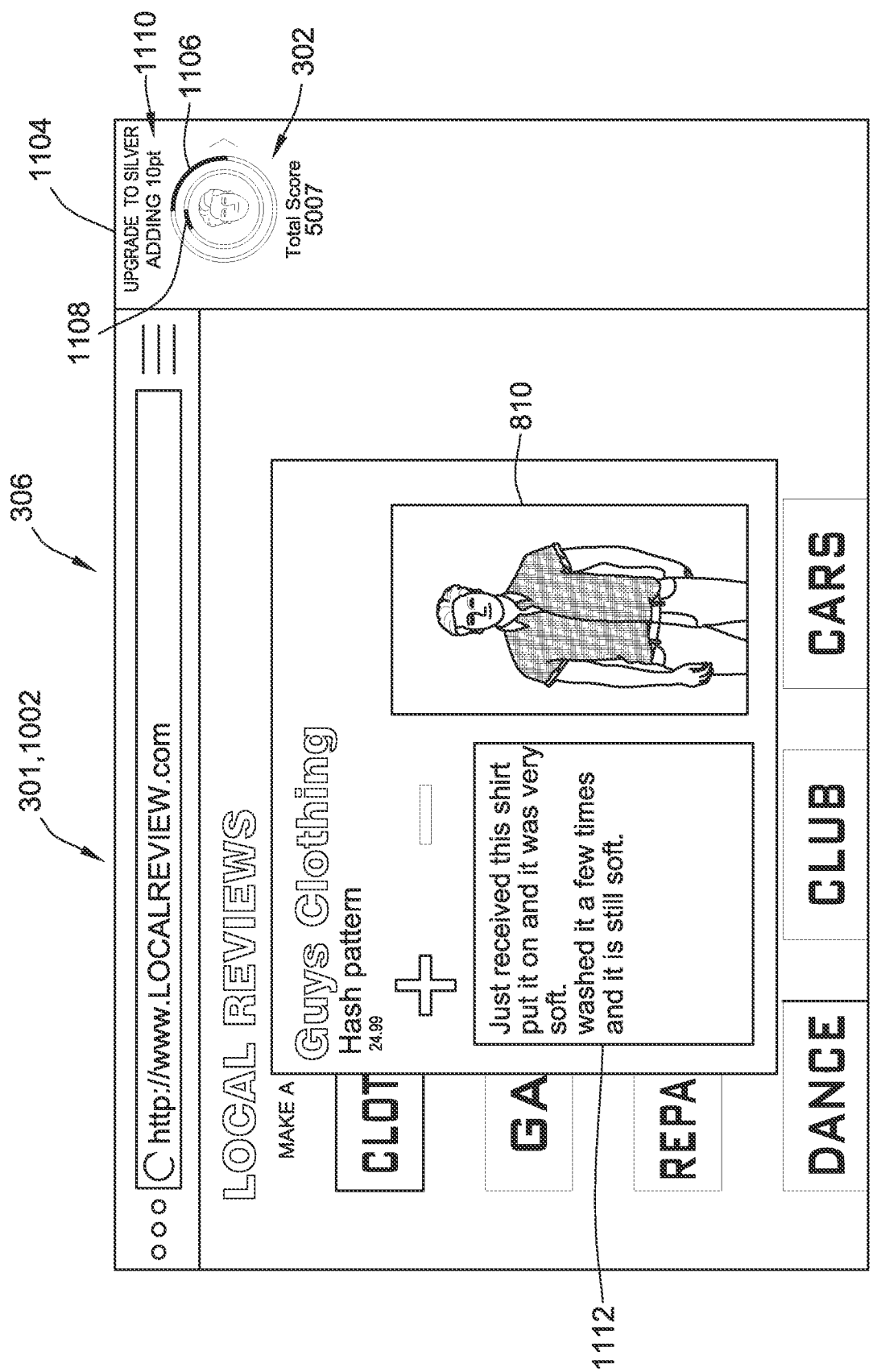
FIG. 11 is an example of the composite UI shown in FIG. 10 in which the user has submitted a review of a clothing item on another UI, and showing the user accumulating sufficient points to be upgraded to a new level according to an aspect of the present disclosure.
Figure 12:
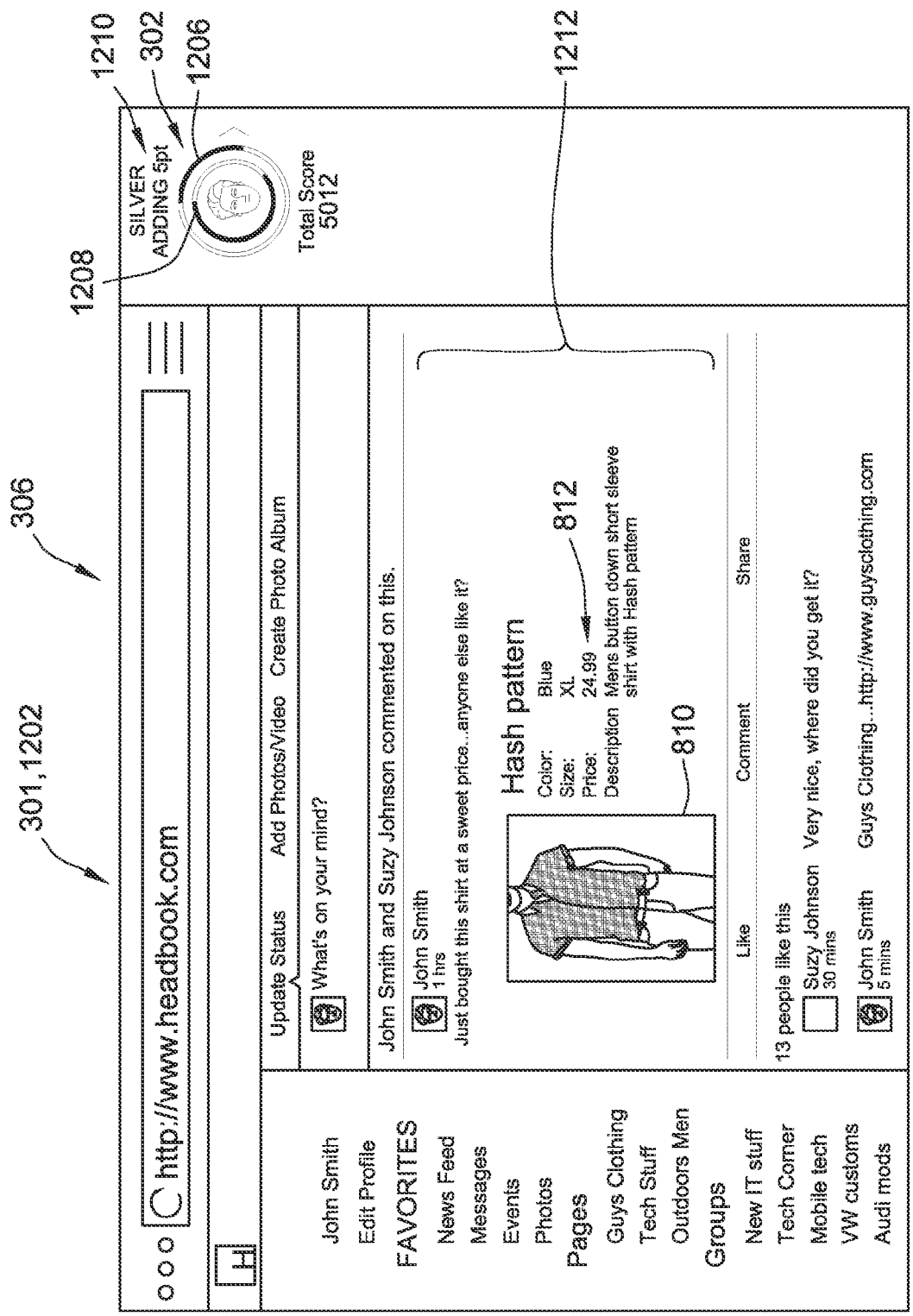
FIG. 12 is an example composite UI showing the user sharing an item available on another UI and showing a graphical representation that includes a meter showing a representation of the number of points accrued by the user for sharing an item at this UI according to an aspect of the present disclosure.

In FIG. 12, the user is taking another type of action on an existing UI 1202, which is different from the purchase action taken in FIGS. 5-9 or the review action taken in FIGS. 10-11. In FIG. 12, the user has shared an item 810 featured on the UI 702 on a UI 1202 that can be, for example, a social networking website or electronic social network, with other users of that social networking website featured in the UI 1202. The composite UI 306 also includes a graphical representation 302 having a first graphical element 1208 that shows the number of points accumulated by the user through actions taken on the social networking website along with the user's total points 1206 represented graphically in the second graphical element 1206. By submitting the review, the user accumulates an additional 5 points according to Table 2 above, increasing the user's total score from 5007 to 5012, which is shown in the composite UI 306 shown in FIG. 12. When the review is submitted, the respective colors that fill the first and second graphical elements 1208, 1206 advances slightly to fill each of the graphical elements 1206, 1208 accordingly.

Figure 13:
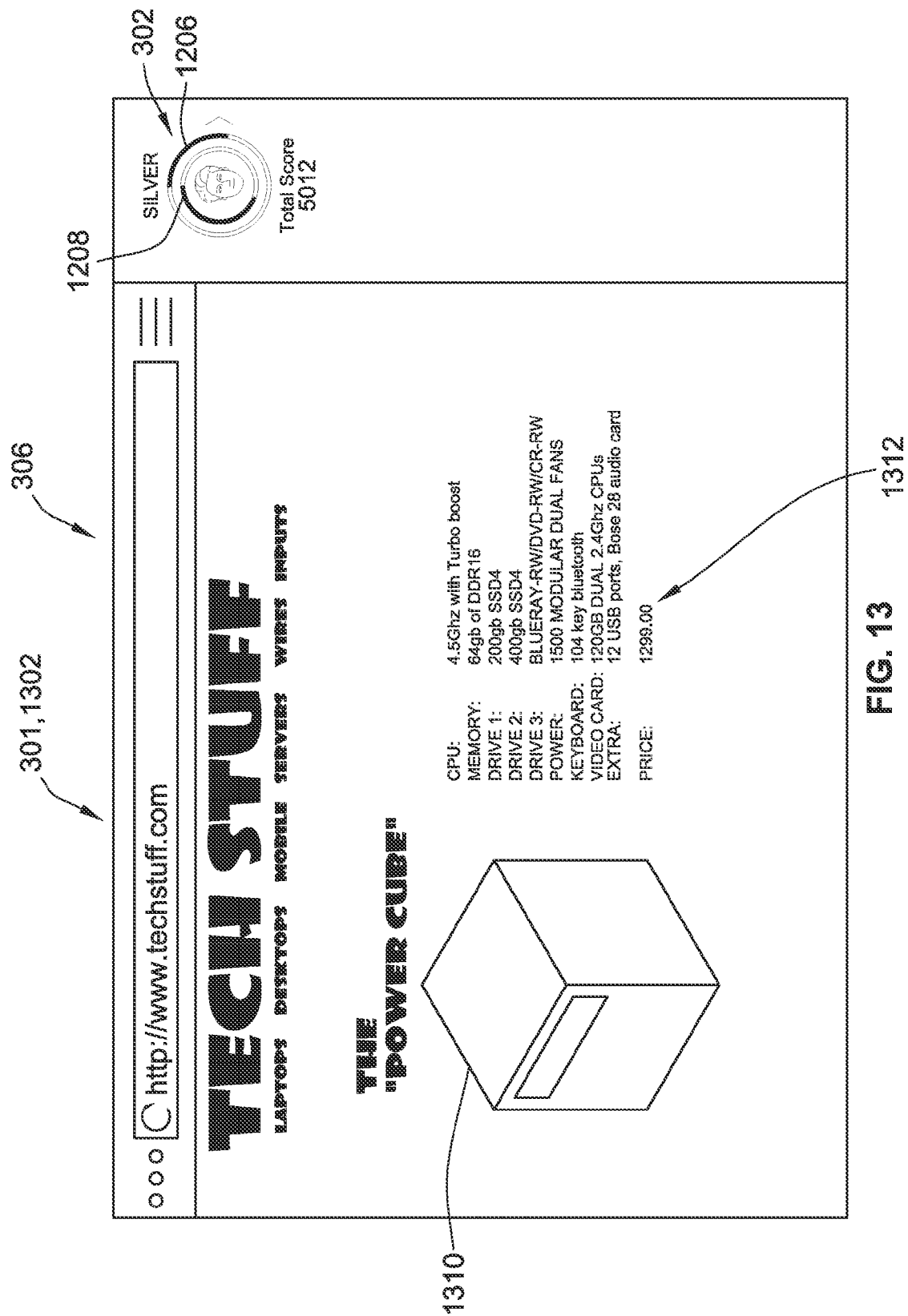
FIG. 13 is an example composite UI featuring a physical item according to an aspect of the present disclosure and showing a graphical representation that includes a meter showing the score for the merchant of this physical item according to an aspect of the present disclosure.

FIG. 13 illustrates yet another example composite UI 306 that combines an existing UI 301, 1302 that features an item of value for purchase and a graphical representation 302 having first and second graphical elements 1208, 1206. The computer 102 extracts at least an image 1310 of the item and a value or price 1312 of the item from the existing UI 1302. The graphical representation 302 shows the user's total score 202 as a curved meter 1206 filled with a color and the user's UI-specific score 204 for the UI 1302 as another curved meter 1208 filled with another color. From the meter 1208, it can be seen that this user has had prior activity with the owner or operator of the UI 1302.

Figure 14A:
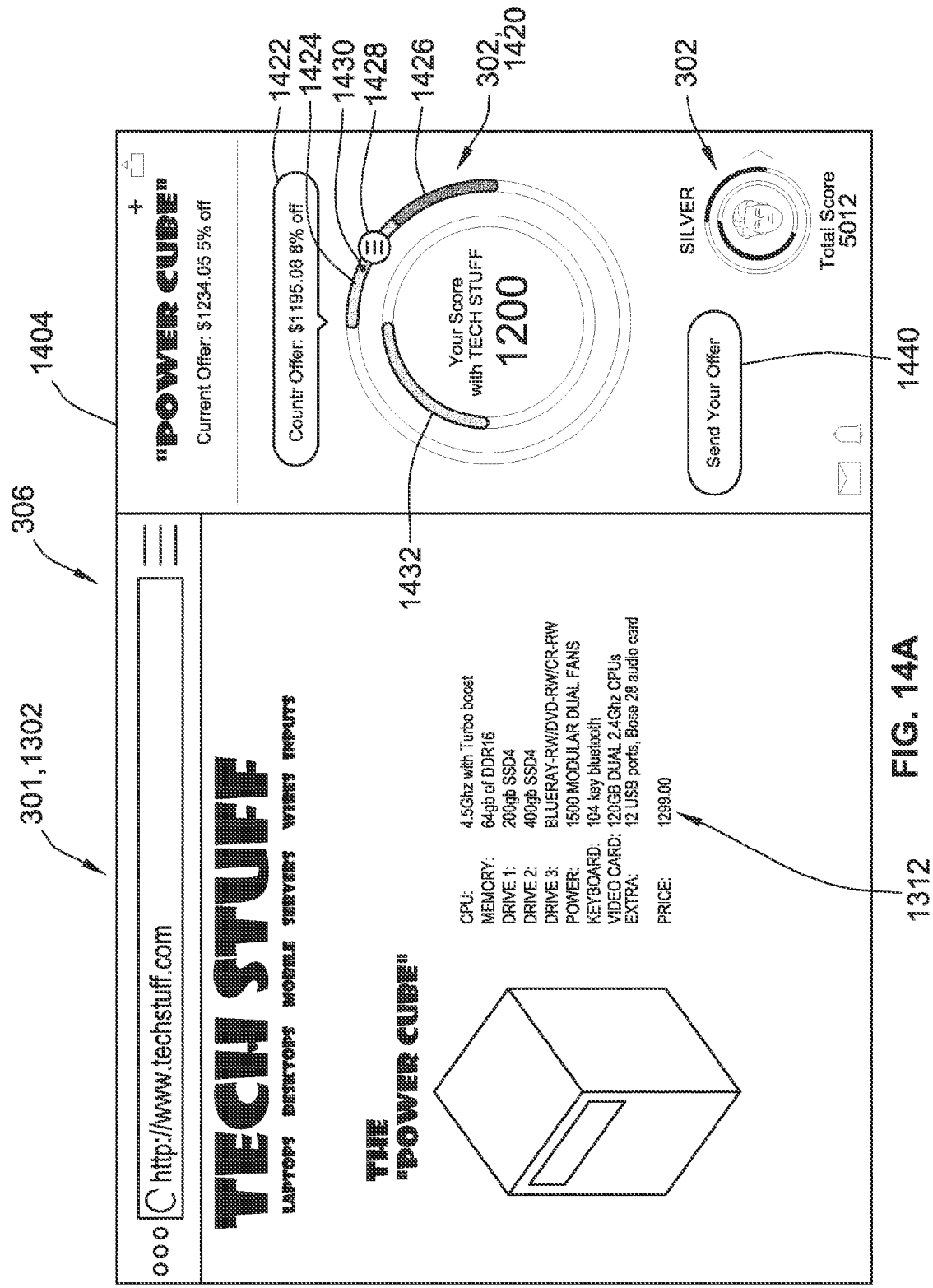
FIG. 14A shows the composite UI of FIG. 13 with the user making a selection using a selectable element on the graphical representation according to an aspect of the present disclosure.

FIGS. 14A-14E illustrate a negotiation process by which the user interacts with the composite UI 306 to negotiate a discount off the asking price of $1299 for the item 1310. FIG. 14F shows an alternate example of a slider that can be used to adjust the amount of a reduction to request off of a value associated with an item featured on the UI 1302. The graphical representation 302 shown in the composite UI 306 includes a selectable graphical element 1428, referred to herein as a slider for ease of discussion. The slider appears on the second graphical element 1424, which has a first color. The user can select the slider and slide it while continuously selecting it along the curved meter corresponding to the second graphical element 1424, 1426 bounded by the color(s) that fill the second graphical element 1424, 1426. When the HMI device 104 is a touchscreen, the user can press and hold the slider while dragging it clockwise or anti-clockwise along the curved shape of the second graphical element 1424, 1426. The second graphical element includes two colors, where a transition between the colors representing a threshold shows the user where along the second graphical element 1424, 1426 the user risks losing points based on the level of points the user enjoys. In this example, the user has just achieved silver level status, which means according to Table 2 above that the user can make an offer between 0-10% without losing any points. FIG. 14A shows that this user has a UI-specific score of 1200 points associated with the UI 1302. The current offer 1422 is shown as an 8% reduction in the price of $1299. A dot 1430 shown on the second graphical element 1424 represents an average accepted offer for this UI 1302. The color transition between the elements 1424, 1426 shows the user that the user can safely request a higher discount by moving the slider 1428 closer to a second section 1426 of the second selectable element without risking losing points. Graphically, this allows the user to quickly make adjustments in a counter offer without having to keep track of the points, level, and how much the user risks losing by exceeding their purchasing clout. The UI-specific score 204 shown as the first graphical element 1432 in the composite UI 306 corresponds to an upper boundary or maximum reduction that can be requested in the price of the item 1310. Theoretically, the user could ask for such a steep discount that it would entirely deplete the UI-specific score 204 and return it to 0 points. But that does not happen in the example shown in FIG. 14B. Here the user has more than enough points for the UI 1302 (i.e., 1200 points) to ask for the maximum discount allowed by the silver level status, or 25%, without risking losing all of the 1200 UI-specific points associated with this UI 1302.

Figure 14B:
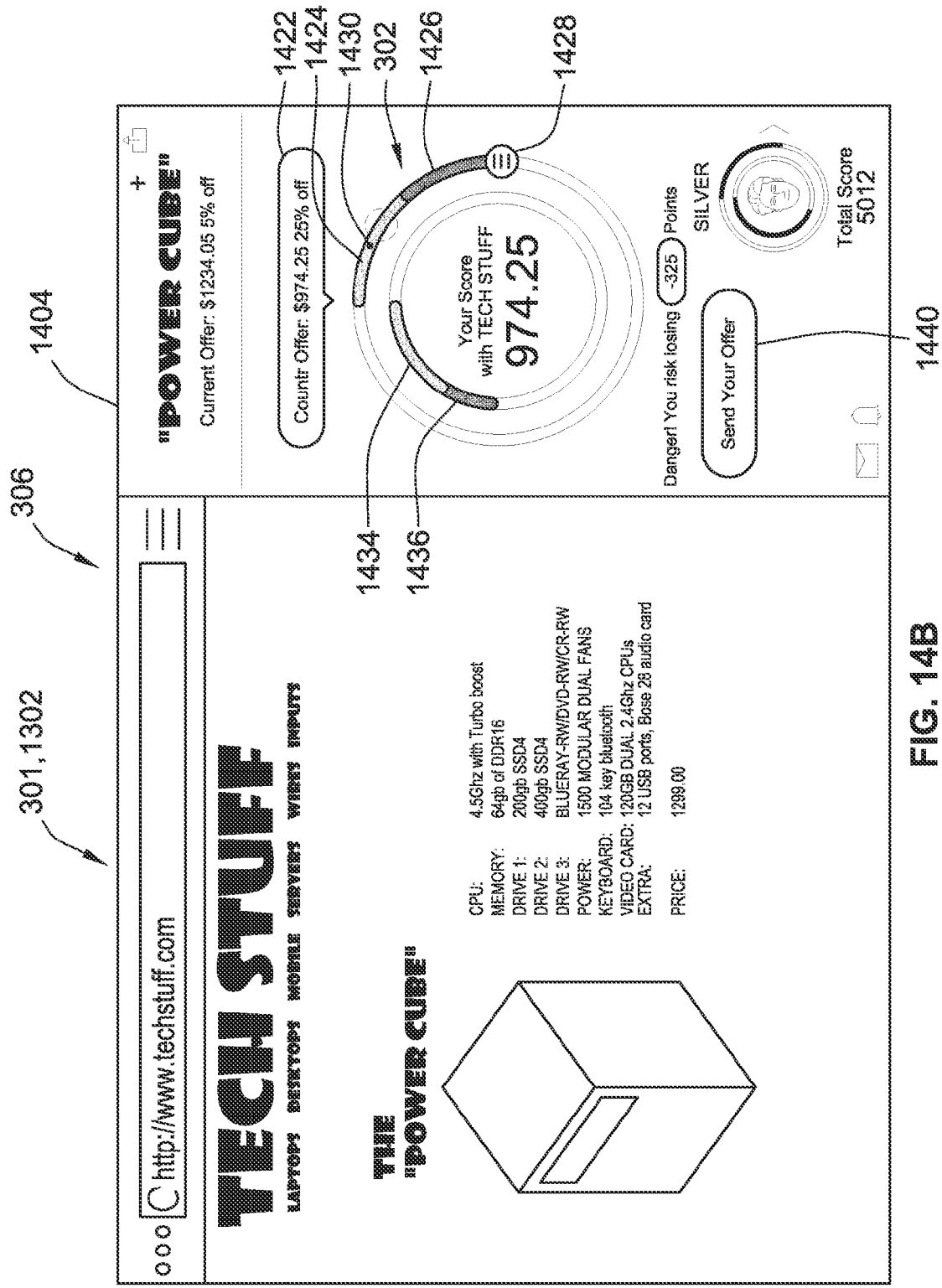
FIG. 14B shows the user moving the selectable element shown in FIG. 14A according to an aspect of the present disclosure.

In FIG. 14B, the user has slid the slider 1428 well beyond the threshold to request a maximum discount of 25% off the price of $1299. As the user slides the slider 1428 beyond the threshold, the color of the first graphical element 1434 begins to change to another color in the section 1436, which enlarges or fills in more as the slider 1428 is slid further away from the threshold. In this example, the user risks losing 325 of the 1200 points if the user obtains the item 1310 at a 25% reduction off the price 1312 displayed on the UI 1302. The dot represented by 1430 represents the average offer of all previously accepted offers for this UI 1302. As the slider 1428 crosses the threshold between the two sections 1424, 1426 of the second graphical element of the graphical representation 302, the section 1436 of the first graphical element begins to grow, filling in a clockwise direction against the direction that the first graphical element normally grows when points are being added. The juxtaposition and shifting of the colors relative to the slider position allow the user to quickly adjust parameters visually without reference to any numbers. The encroachment of the second section 1436 into the first graphical element shows the user graphically how much the user stands to lose in exchange for achieving the requested reduction of 25% off the price 1312 for the item 1310. A warning can be displayed in the frame 1404 of the composite UI 306 to warn the user how many points the user risks losing (here 325 points). The user can submit the offer requesting the reduction of 25% by selecting the selectable element 1440, which bears indicia "Send Your Offer."

Instead of showing two colors initially in the sections 1424, 1426, the entire total score meter can be shown in an initial color, and then as the slider 1428 is slid past the threshold beyond which points begin to be deducted, the second section 1426 can change to another. When the user releases the slider 1428, such as shown in FIG. 14B, the second section 1426 is completely filled with another color. But this second section does not change color until the slider 1428 is slid across the threshold. The selection by the user is indicated when the HMI device 104 detects a release of the selectable graphical element 1428 (such as when the user lets go of a mouse button or takes a finger away from a touchscreen overlaying the video display 116). Alternately, when the HMI device 104 includes a gesture sensing system, including a digital camera, a finger gesture made by the user can be detected to adjust the slider. For example, the gesture sensing system can detect when the user mimics a rotation motion with the thumb and forefinger of an invisible "air"

knob in either the clockwise or anti-clockwise direction as if turning a physical knob, and the computer 102 can cause the slider 1428 to move in the direction of rotation detected from the gesture.

Figure 14C:
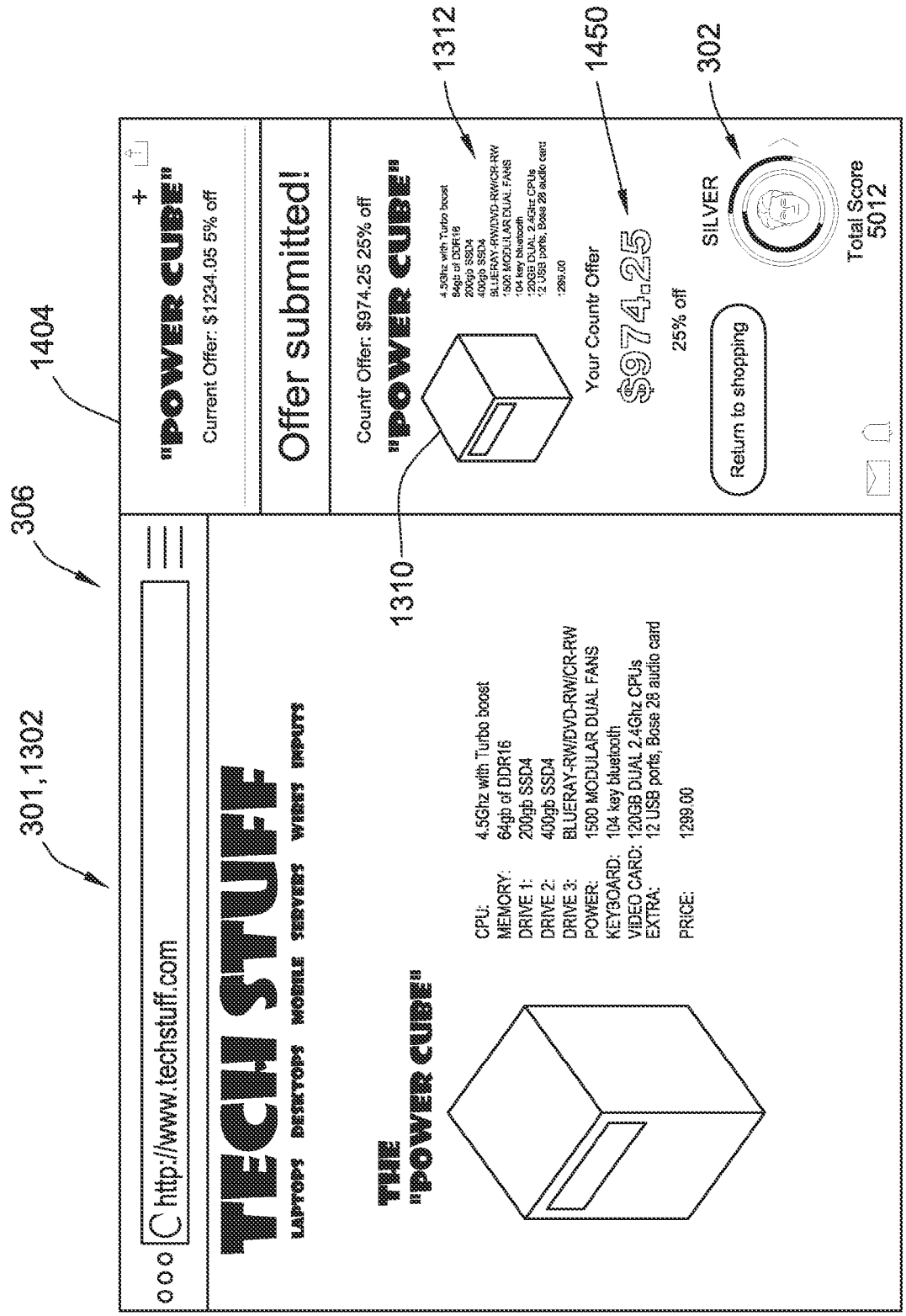
FIG. 14C shows the user submitting an offer using the selectable element shown in FIG. 14B according to an aspect of the present disclosure.

In FIG. 14C, the composite UI 306 reports to the user that the offer for a 25% reduction in the value 1312 of the item 1310 has been submitted to the owner or operator of the UI 1302. The computer 102 generates an electronic record to be communicated back to the external server 114 hosting the UI 1302 or to another backend server through an API operated by the owner or operator of the UI 1302. The electronic record includes the item 1310, and the requested reduction in the form of a percentage discount (e.g., 25%) or in the form of a reduced value (e.g., $974.25). No information regarding the user is communicated to the UI 1302. The electronic record may include one or both of the user's UI-specific score 204 associated with the UI 1302 and the total score 202. This allows the owner or operator (merchant) to evaluate the (anonymous) user's purchasing clout and how much the merchant may value this (anonymous) user's action and future actions. Again, preferably, the user's identity is not conveyed to the merchant, although the merchant may know the user's identity through the user's other interactions with the merchant's UI 1302 (e.g., such as through the use of cookies, locally stored objects, or other persistently stored objects that include information about the user).

In another example, the slider 1428 can be shown on the first graphical representation instead of the second graphical representation, such as shown in FIG. 14F. Here, the user moves the slider 1428 along the first graphical representation to increase or decrease the extent of a reduction in the value of the item 1310 that the users wishes to request. In another example, a second slider (not shown) in addition to the slider 1428 can be shown on the first graphical representation corresponding to the UI-specific score 204, allowing the user to manipulate either or both sliders to request reductions in the item 1310 of interest.

Figure 14D:
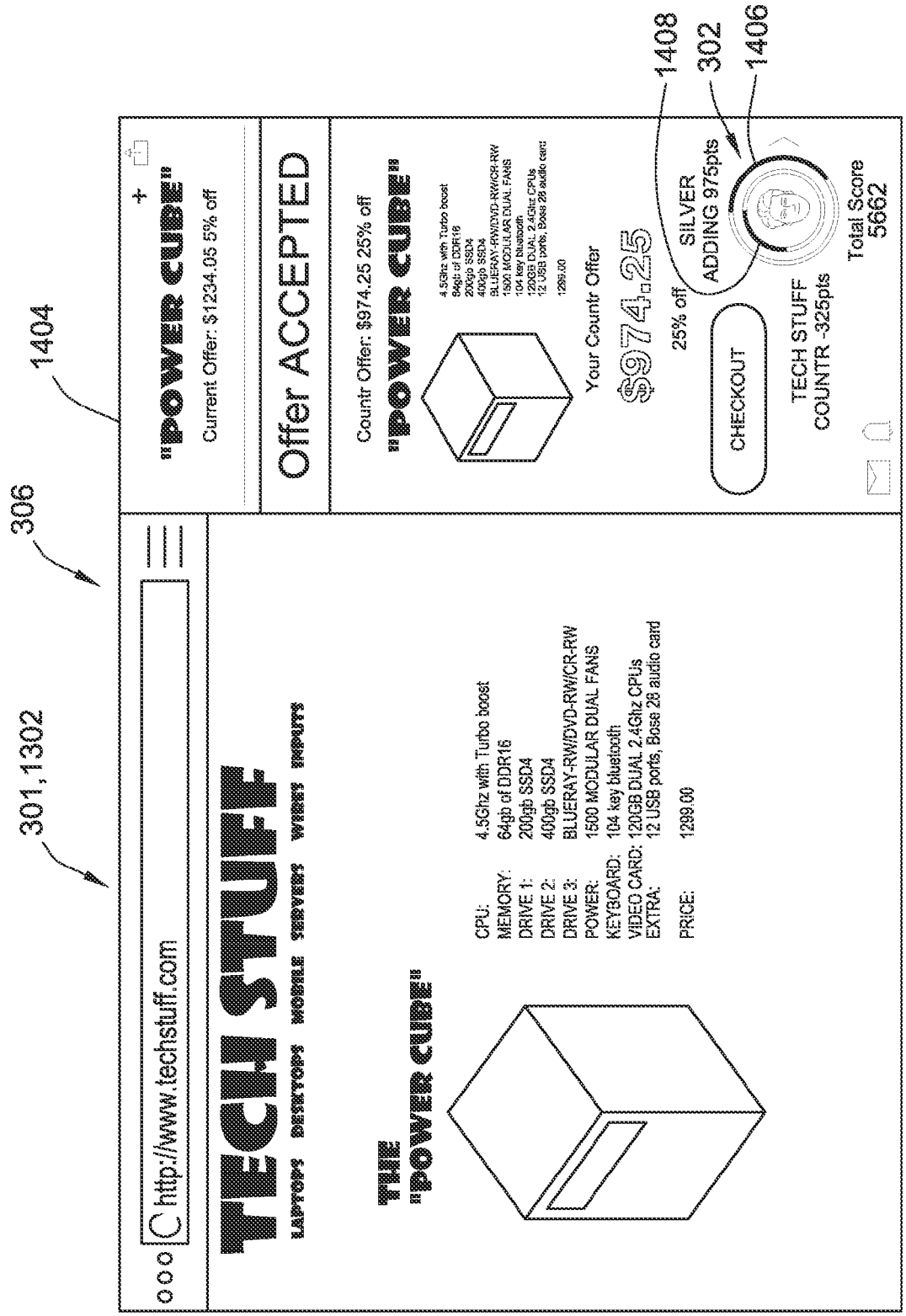
FIG. 14D shows that the offer submitted by the user in FIG. 14C has been accepted by the merchant of the physical item featured in FIG. 13 according to an aspect of the present disclosure.

Returning to FIG. 14C, the offer is submitted by the computer 102 as an electronic record to the merchant selling the item 1310 on the UI 1302. In FIG. 14D, the merchant has decided to accept the requested reduction of 25%, and this is conveyed on the frame 1404 of the composite UI 306. The graphical representation 302 shows the updated points for the UI-specific score 202 associated with the UI 1302 and for the total score 204. Here, the user gained 975 points thanks to the purchase of the item 1310 (and, according to Table 2 above, the user accumulates 1 point for every $1 spent), but in this example can lose 325 points in exchange for requesting a discount that exceeded what the user could request at the silver level. Alternately, the user can lose points (325 in this example) only if the offer is rejected by the merchant selling the item 1310 on the UI 1302. The two graphical elements of the graphical representation 302 are updated accordingly. Comparing FIGS. 14C and 14D, the first graphical element 1408 corresponding to the UI-specific score 202 associated with the UI 1302 has shrunk by an amount commensurate with reducing 1200 points by 325 points while the second graphical element 1406 has increased commensurate with adding 975-325 points to 5012 points. The updated total score 202 for this user is increased from 5012 to 5662 (5012+975-325).

Figure 14E:
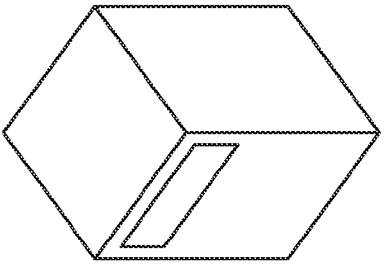
FIG. 14E shows a checkout frame of the composite UI of FIG. 13 to allow the user to purchase the physical item featured in FIG. 13 for the price accepted by the merchant in FIG. 14D according to an aspect of the present disclosure.
Figure 14F:
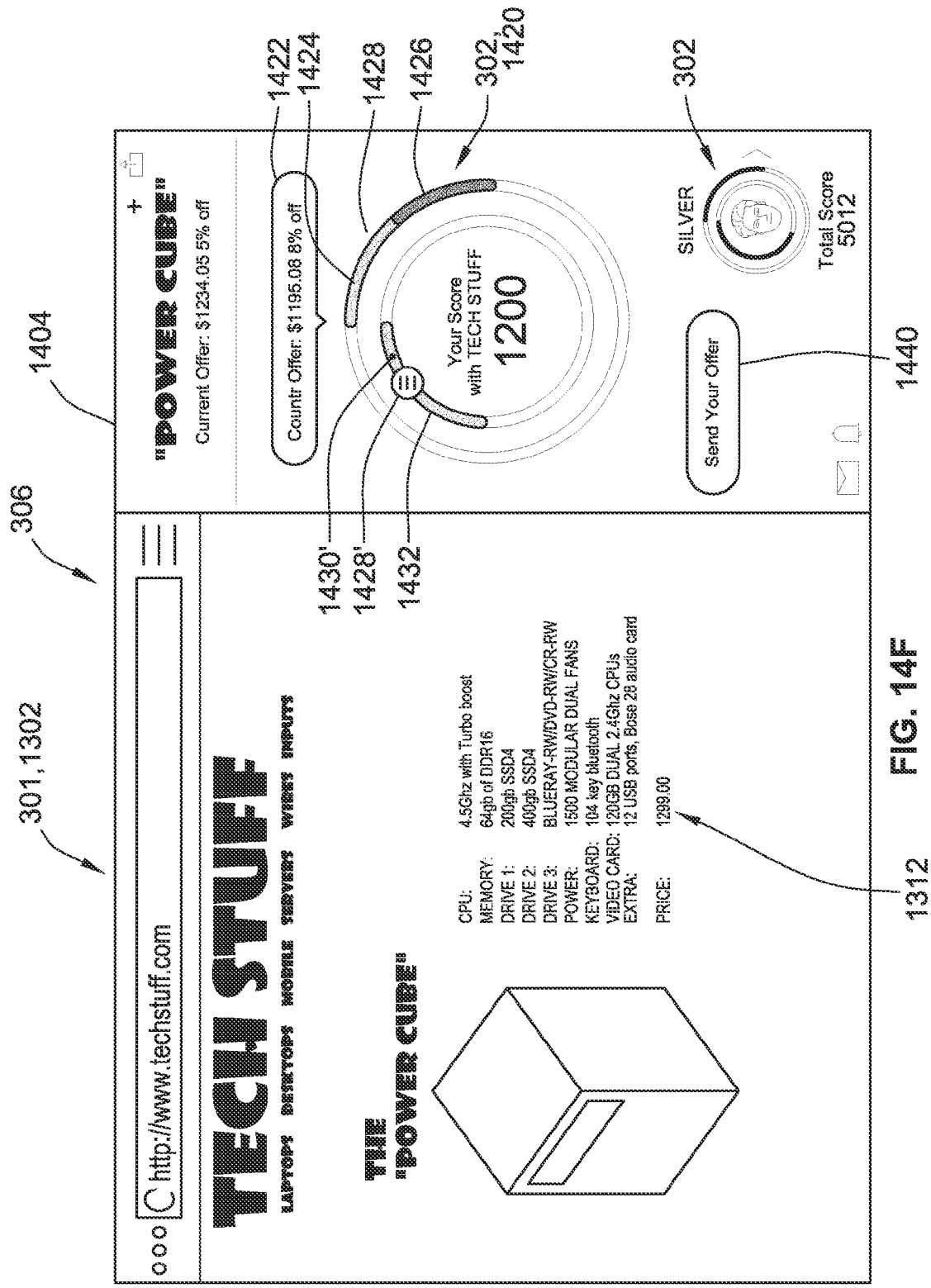
FIG. 14F shows an example composite UI featuring a graphical representation and a selectable element on the other of the two meters shown in FIG. 14A according to an aspect of the present disclosure.

In FIG. 14E, the composite UI 306 shows an example checkout process. The checkout process can alternately be conventionally carried out on the UI 1302, but in this example, the composite UI 306 completes the electronic transaction between the user and the merchant. Again, the identity of the user can remain anonymous to the merchant in this example. The area 1450 of the frame 1404 is auto-populated in a similar manner as described in connection with FIG. 5 above. A user-entry area 1452 requires entry by the user of information necessary to complete the electronic transaction, again in a similar manner as described in connection with FIG. 5. A selectable element 1454 allows the user to complete the electronic transaction on the frame 1404 of the composite UI 1302. The computer 102 assembles an electronic record including the purchase amount and the item 1310 and sends the same to the merchant for accounting and reconciliation and processing. The processing can include the merchant's sending the item 1310 (when the item is a tangible item) to a physical address of the user.

As mentioned above, instead of the slider 1428 appearing on the second graphical element, it can instead appear on the first graphical element 1432. In FIG. 14F, a slider 1428' is shown on the first graphical element, which graphically shows the user's UI-specific score 204 associated with the UI 1302. Here, a dot or other indicia 1430' on the first graphical element 1432 shows where the current offer of 8% off would fall on the curved meter representing the first graphical element 1432.

Figure 15:
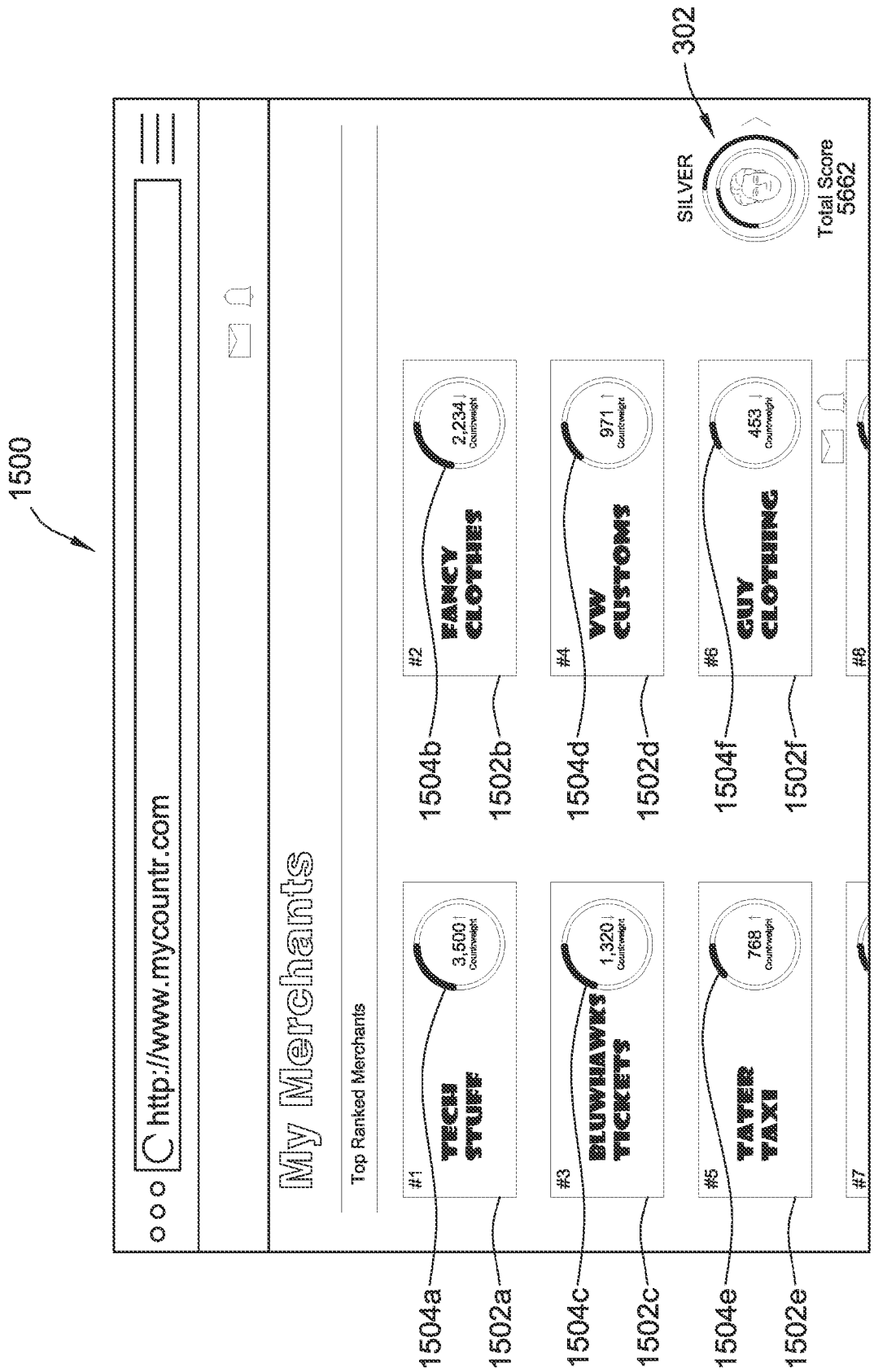
FIG. 15 is an example UI showing merchants and the respective points for each merchant that the user has accumulated through actions taken with each merchant's UI according to an aspect of the present disclosure.

FIG. 15 is an example user interface 1500 that can be displayed on the video device 116, which displays a summary in a graphical form of the various merchants and associated UI-specific scores using the circular meters described above. In this example, six selectable elements 1502a-f are shown, with corresponding graphical objects 1504a-f that indicate how many points the user has accrued for each of the merchants featured in the selectable elements 1502. A graphical representation 302 is also shown, here corresponding to the merchant depicted in the selectable element 1504a. The user has selected this selectable element, which causes the graphical representation 302 to display the total score along with the merchant-specific score for the merchant associated with the selectable element 1504a. Inside each circular meter, the number of points can be displayed along with an arrow pointing up or down, depending on whether the last action by the user with that merchant caused the points to increase (arrow up) or decrease (arrow down). The skilled person will appreciate that there are many different ways of formatting and showing the user's UI-specific scores across all merchants, but this particular example emphasizes the circular meter as a visual indicator of the respective scores, to highlight the ease with which a user can see at a glance how much purchasing clout the user enjoys with each merchant.

Figure 16:
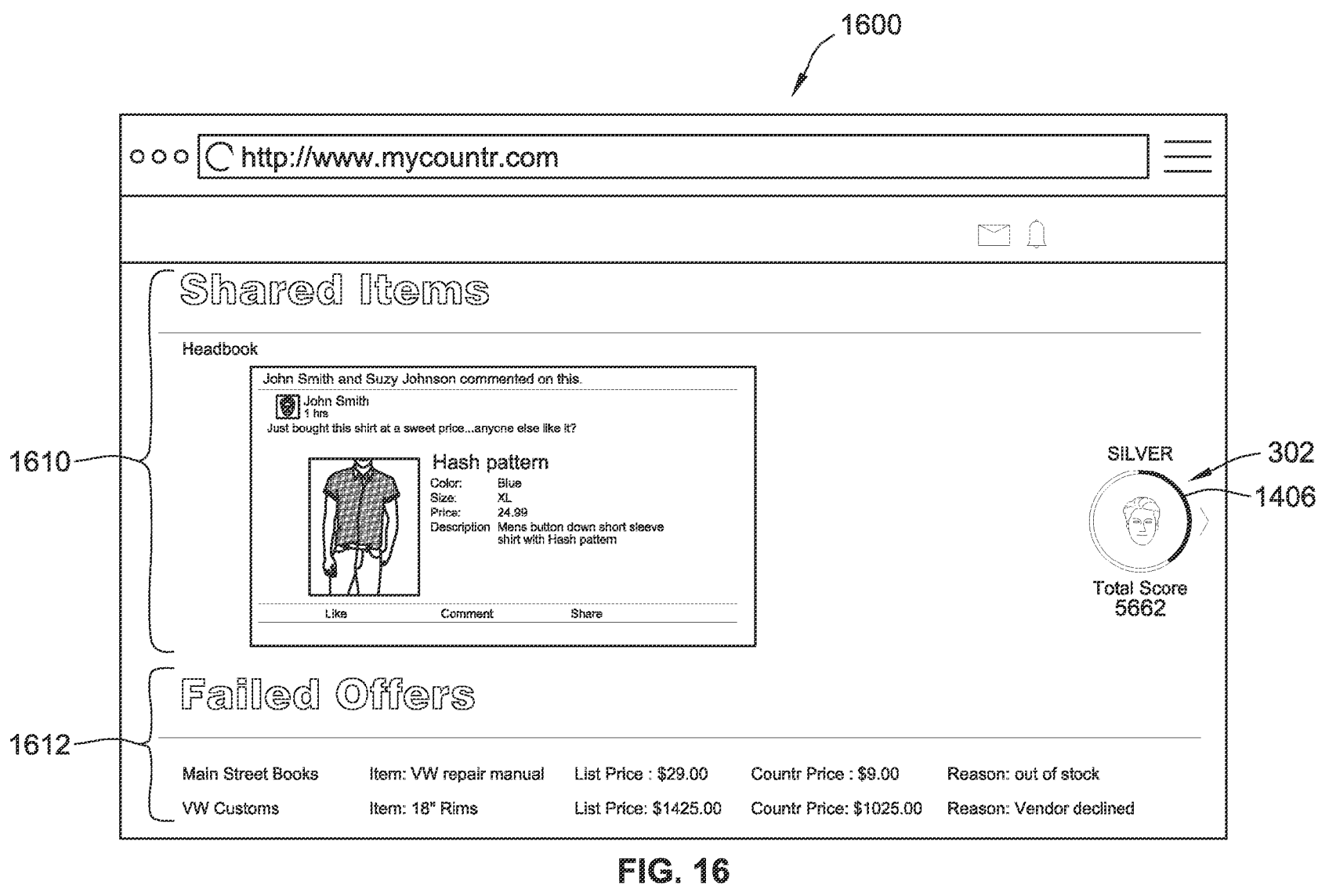

FIG. 16 is an example of another page or window displayed on a user interface 1600, allowing the user to see their actions by action type. In this example, the most recent items shared by the user are displayed in the area 1610. A graphical representation 302 is also shown on the UI 1600 in the form of a circular meter, which is filled with a color 1406 to reflect the user's total score of 5662. Below the section 1610 labeled Shared Items is another section 1612 labeled Failed Offers, which is a summary of offers that were declined or rejected by one or more merchants, or that did not materialize in a purchase for some other reason, along with the reason for why the purchase transaction was not consummated.

Figure 17:
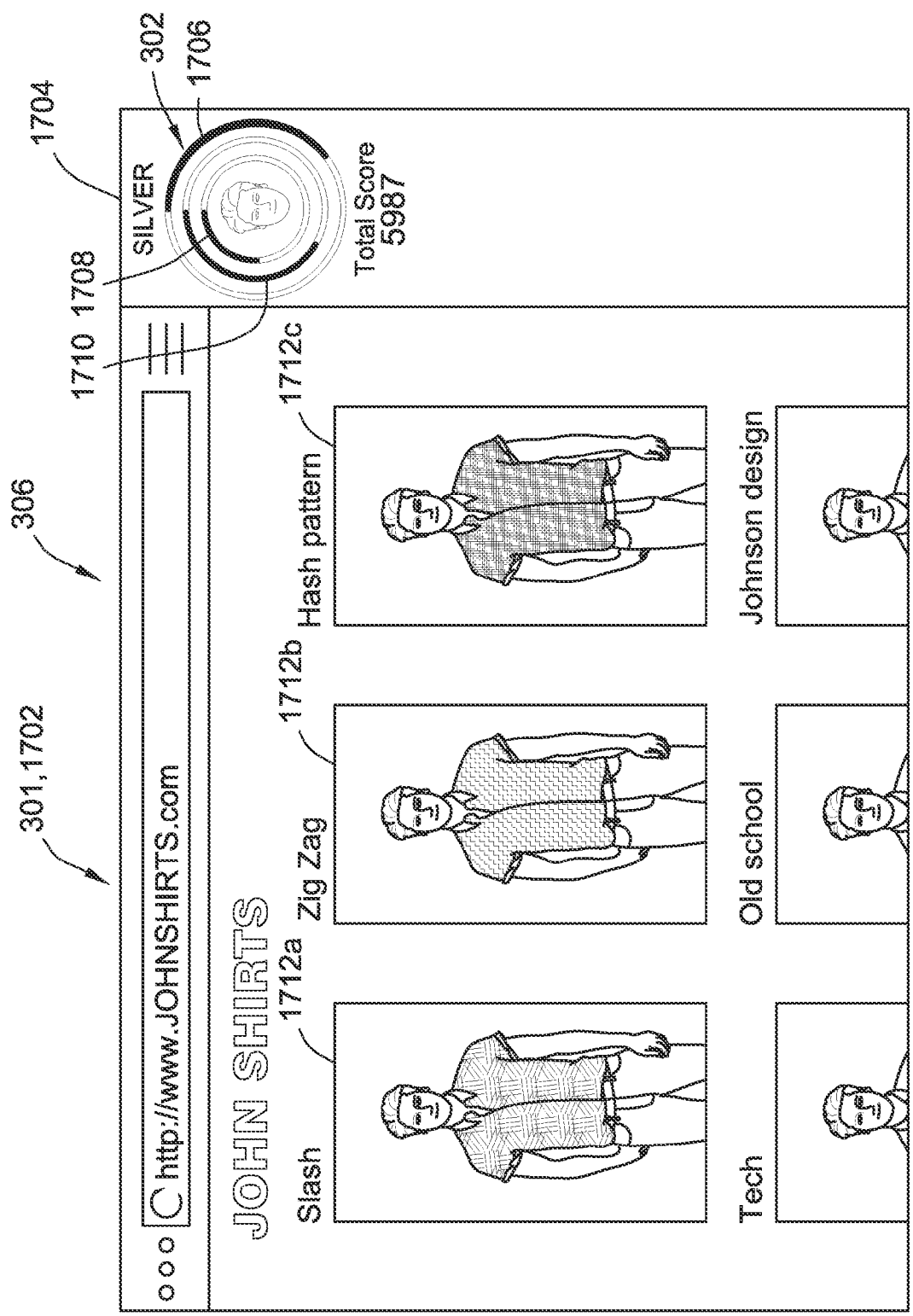
FIG. 17 is an example composite UI featuring a graphical representation showing three meters arranged in concentric circles, where the middle meter shows the number of points the user has accumulated for a category associated with an item featured on the composite UI according to an aspect of the present disclosure.

FIG. 17 shows a composite UI 306 showing a graphical representation 302 with three circular meters instead of two as shown above. In this example, the innermost smallest circular meter, shown as a first graphical element 1708, represents the user's UI-specific score associated with the UI

310, 1702. The middle circular meter, shown as a second graphical element 1710, represents a category score associated with actions taken by a user with UIs of a certain category. In this example, the category is clothing, so the middle meter 1710 shows how many points the user has accumulated by taking actions on UIs that feature clothing items. The outermost meter, shown as a third graphical element 1706, represents the total score associated with the user. The category score, represented by the graphical element 1710 can also be conveyed to the merchant to try to sway the merchant to accept a steeper discount than the user's purchasing clout may otherwise call for. If the user has a relatively low score with a particular clothing merchant, but has made lots of purchases in the clothing category, this merchant could use this purchase as an opportunity to offer the user a greater discount to try to build loyalty with the user. So even though the user may have a relatively low score with this merchant, the merchant may still be willing to accept an offer that requests a greater reduction than the merchant normally would if it knew only that this (anonymous) user made only a few purchases with the merchant. Knowing that this user spends a lot of money on clothing and/or is a heavy influencer of others in this category (e.g., refers lots of friends to clothing or writes lots of clothing reviews) would be a useful data point for the merchant, a kind of visibility that is not currently available.

Figure 18:
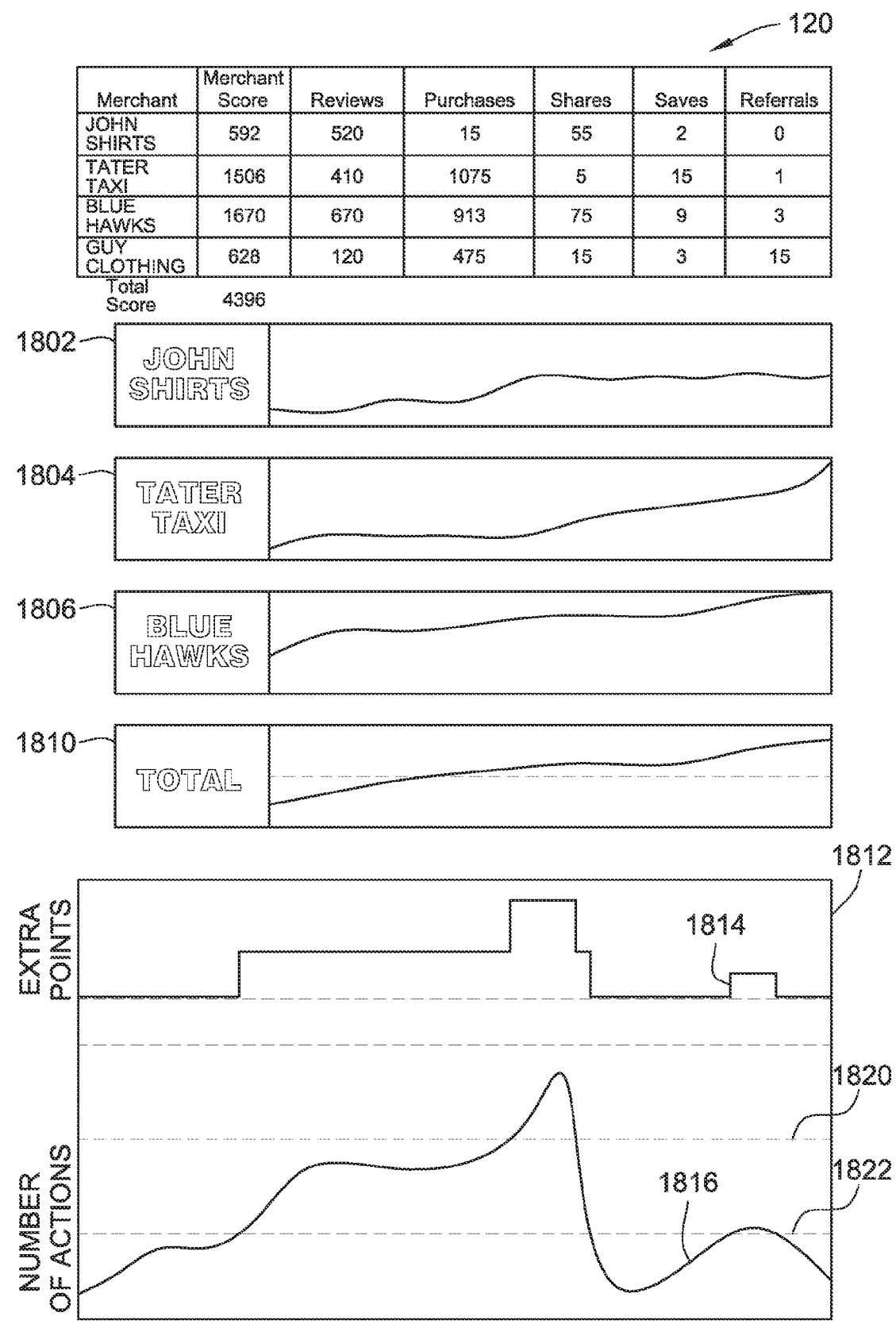
FIG. 18 is a collection of tables and charts showing different ways points can be tracked and point trends can be displayed along with an example of how the user can earn points faster based on a frequency of the number of actions the user takes within a time period according to an aspect of the present disclosure.

FIG. 18 shows a table and charts that illustrate graphically how points are accumulated. The chart on the bottom of FIG. 18 is an example of how a user can accumulate points faster based on a frequency of the number of actions taken by the user. The example Table 1 shows points that can be assigned for each type of action taken, but the point values are static. In this example, the points can accumulate faster as the frequency of actions taken by the user increases.

First, the example table that can be represented in the database 120 is shown at the top of FIG. 18. Here, four different merchants are shown along with their respective merchant scores, reflecting the number of points the user has accumulated with each merchant. The points are broken down in the next five columns according to the type of action taken that resulted in the point accrual. Thus, for example, the user has earned 520 merchant-specific points 204 for submitting reviews for items available for purchase at the merchant, John Shirts. The total score 202 is also indicated, which is the sum of the merchant-specific points listed in the rows above the total score column.

The next set of charts 1802, 1804, 1806 illustrate a point trend over time for each of the first three merchants, and the chart 1810 is a point trend over time of the total score. The x-axis is time, but not necessarily on a linear scale, and the y-axis is number of points earned for that merchant by the user (different users would of course have different point trends). The last chart 1812 shows two curves 1814, 1816. This chart 1812 graphically illustrates how the user can earn points faster based on frequency of actions. In this example, two frequency thresholds 1820, 1822 are established. The x-axis is time, and the y-axis for the curve 1816 is a number of actions, which can be seen over a time period on the x-axis. As the user achieves a certain frequency of actions (e.g., more than 50 actions per week), the first frequency threshold 1822 is crossed, which enables the user to earn extra points greater than those in Table 1. For example, the user can start earning double the number of points listed in Table 1. If the user achieves an even higher frequency of actions (e.g., more than 100 actions per week), the second frequency threshold 1820 is crossed, which enables the user to earn even more points than when the first frequency threshold 1822 was crossed. For example, the user can start earning triple the number of points listed in Table 1. But when the frequency of actions dips below either or both of the thresholds, the extra points will drop off accordingly. Acceleration of earned points will also cause the user to reach the next level of points as summarized in Table 2 above. The charts are for ease of discussion and are not necessarily displayed to the user, although they can be.

While this disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of the invention as defined by the appended claims.

Each of these embodiments and obvious variations thereof is contemplated as falling within the spirit and scope of the claimed invention, which is set forth in the following claims. Moreover, the present concepts expressly include any and all combinations and sub-combinations of the preceding elements and aspects.

What is claimed is:

1. A computer-implemented method of dynamically modifying an electronic user interface downloaded for display on one or more electronic video displays, comprising:
capturing, using an electronic computer, a plurality of physical inputs made via one or more human-machine interface devices, each of the plurality of inputs being indicative of a human-machine action taken on one or more software applications and associated with an electronic user account of a human user, wherein the human-machine action includes receiving an electronic representation of a physical input of a selectable element on an electronic user interface featuring one or more items, and wherein the electronic user account includes a name of the human user;
associating, using the computer, each of the plurality of inputs with a corresponding point value, where an extent of the point value is a function of at least a type of the respective human-machine action associated with the respective one of the inputs, to produce a plurality of point values;
calculating, using the computer, a total score based on all of the corresponding point values associated with the plurality of physical inputs;
calculating, using the computer, for each of a plurality of external existing electronic user interfaces, an interface-specific score that is based on at least some of the point values associated with the corresponding one of the plurality of external existing electronic user interfaces, wherein each of the external existing electronic user interfaces is downloaded from a different one of external computer servers over a computer network to which the computer is coupled;
dynamically generating, using the computer, a composite electronic user interface from at least (1) a selected one of the existing external electronic user interfaces downloaded from a first of the external computer servers over the computer network (selected user interface) and (2) the interface-specific score corresponding to the selected user interface, wherein the dynamically generating includes:
extracting, from the selected user interface or the first external computer server, at least identification information of the selected user interface to determine which of the interface-specific scores to select, retrieving, using the computer, the total score and the selected interface-specific score that corresponds to the selected user interface determined by the extracting, and featuring a dynamically changing graphical representation with the existing electronic user interface, the dynamically changing graphical representation featuring a first graphical element representing the selected interface-specific score corresponding to the selected user interface, and a second graphical element representing the total score, to produce the composite electronic user interface that includes at least a portion of the existing electronic user interface and the second graphical element of the dynamically changing graphical representation, wherein the first graphical element has a first elongated curved shape following a first generally curved path and being at least partially filled with a first visually distinguishable indicia in a clockwise or anti-clockwise direction along the first generally curved path, wherein an extent of the first visually distinguishable indicia is commensurate with the selected one of the plurality of interface-specific scores; and the second graphical element has a second elongated curved shape following a second generally curved path concentric with the first generally curved path and being at least partially filled with a second visually distinguishable indicia in the other of the clockwise or anti-clockwise direction along the second generally curved path, wherein the first visually distinguishable indicia is visually distinguishable from the second visually distinguishable indicia, and wherein an extent of the second visually distinguishable indicia is commensurate with the total score;

and the computer-implemented method further comprising causing the composite electronic user interface to be displayed on one of the one or more electronic video display devices.

2. The computer-implemented method of claim 1, wherein the extracting further extracts an attribute of an item portrayed on the selected user interface, wherein the attribute includes a number indicative of a value of the item.

3. The computer-implemented method of claim 2, wherein the identification information extracted from the selected user interface includes an identity of a creator or owner of the content portrayed on the selected user interface or an operator of the selected user interface, and wherein the attribute further includes any one or more of an image of the item, a quantity of a desired number of the items, a size of the item, a color of the item, or an expiration of the item.

4. The computer-implemented method of claim 3, wherein the extracting includes connecting to the first external computer server via an application programming interface (API) and requesting through the API the identification information and the attribute.

5. The computer-implemented method of claim 1, further comprising:

dynamically generating, using the computer, a second composite electronic user interface from at least (1) a second selected one of the existing electronic user interfaces downloaded from a second of the external computer servers over the computer network (second selected user interface) and (2) the interface-specific score corresponding to the second selected user interface, wherein the dynamically generating the second composite electronic user interface includes:

extracting, from the second selected user interface or the second external computer server, at least identification information of the second selected user interface to determine a second one of the interface-specific scores to select, retrieving, using the computer, the total score and the selected second interface-specific score that corresponds to the second selected user interface, and dynamically changing the graphical representation on the second existing electronic user interface such that the first graphical element represents the second selected interface-specific score corresponding to the second selected user interface and the second graphical element represents the total score, to produce the second composite electronic user interface that includes at least a portion of the second existing electronic user interface and the dynamically changed graphical representation; and the computer-implemented method further comprising causing the second composite electronic user interface to be displayed on any of the one or more electronic video display devices.

6. The computer-implemented method of claim 1, further comprising:

monitoring, using the computer, a frequency that the plurality of physical inputs are made; and enhancing the extent of the point value as a function of the frequency such that point values are accumulated toward the total score at a faster rate as the frequency increases.

7. The computer-implemented method of claim 1, wherein the type of the human-machine action includes (1) completing an electronic transaction to cause an item to be conveyed to a physical location as directed by the human user associated with the user account, (2) submitting an electronic review for an item portrayed on an electronic user interface, (3) sharing information about an item on a social media networking user interface, or (4) storing information about an item for later retrieval for completing an electronic transaction involving the stored item.

8. The computer-implemented method of claim 1, where, prior to the step of dynamically generating, each of the existing electronic user interfaces was unmodified by the claimed method.

9. The computer-implemented method of claim 1, wherein the one or more software applications includes an electronic web browser used on a computing device operated by the user or a dedicated software application used on a computing device operated by the user.

10. The computer-implemented method of claim 9, wherein the computing device is a personal computer, a portable tablet computer, a portable smartphone, or a portable laptop computer.

11. The computer-implemented method of claim 1, wherein the dynamically generating further includes:

adding to the composite electronic user interface a selectable element that, in response to being selected via the one or more human-machine interface devices, causes the composite electronic user interface as displayed on the electronic video to include attributes of the item including its value.

12. The computer-implemented method of claim 1, further comprising dynamically changing the second graphical element as the total score increases as a result of accumulating additional point value associated with additional physical inputs on the one or more software applications; and updating the composite electronic user interface to cause any of the one or more electronic video displays device to display the dynamically changed second graphical element in real time.

13. The computer-implemented method of claim 1, further comprising:
   receiving, via the one or more human-machine interface devices, a physical input representing a reduction in the value of the item;
   receiving, via the electronic network interface device, an indication whether the reduction is accepted;
   responsive to the reduction being accepted, the computer determining whether the reduction exceeds a threshold, and, if so, reducing the interface-specific score to produce a reduced score;
   causing to be displayed on the electronic video display device a new value based on the value and the reduction; and
   the electronic computer communicating over the computer network to complete an electronic transaction on the composite user interface using the new value to cause the item to be conveyed to a physical location as directed by the human user associated with the user account.

14. The computer-implemented method of claim 13, wherein the threshold is commensurate with the interface-specific score such that the higher the interface-specific score the higher the threshold, thereby allowing a higher reduction to be requested the higher the interface-specific score.

15. The computer-implemented method of claim 14, further comprising determining, based on at least the interface-specific score, a selected one of a plurality of levels, where each of the levels defines a range of permissible reductions and a range of protected reductions, where the range of permissible reductions is bounded by a minimum reduction that can be requested to reduce the value of the item and by a maximum reduction that can be requested to reduce the value of the item, and where the range of protected reductions is bounded by a minimum protected reduction that can be requested to reduce the value of the item without causing a reduction in the interface-specific score or in the total score and by a maximum protected reduction that can be requested to reduce the value of the item without causing a reduction in the interface-specific score or in the total score, and where the range of permissible reductions and the range of protected reductions increase with each level of the plurality of levels.

16. The computer-implemented method of claim 1, wherein the dynamically changing graphical representation is portrayed on the electronic video display as an overlay relative to the existing electronic user interface or is embedded into the existing electronic user interface.

17. The computer-implemented method of claim 1, wherein the graphical representation includes an avatar.

18. The computer-implemented method of claim 1, further comprising communicating, via an electronic network interface device, the reduction to the first external computer server.

19. The computer-implemented method of claim 1, further comprising: causing to be displayed on the composite electronic user interface a selectable graphical element on the second graphical element, wherein the selectable graphical element is made to appear on the electronic video display device to slide along the second elongated curved shape the selectable graphical element is being continuously selected, and, as the selectable graphical element is slid along the second elongated curved shape, the second visually distinguishable indicia that fills the second elongated curved shape to one side of the selectable graphical element changes to a third visually distinguishable indicia that is distinct from the second visually distinguishable indica; and receiving, via the one or more human-machine interface devices, a selection using the selectable graphical element on the second elongated curved shape where a release of the selectable graphical element is detected by the one or more human-machine interface devices.

* * * * *

UNITED STATES PATENT AND TRADEMARK OFFICE
CERTIFICATE OF CORRECTION

PATENT NO. : 9,652,801 B2  
APPLICATION NO. : 14/800872  
DATED : May 16, 2017  
INVENTOR(S) : Manon Roux et al.

Page 1 of 1

It is certified that error appears in the above-identified patent and that said Letters Patent is hereby corrected as shown below:

In the Claims

At Column 28, Line 33 (Claim 19), please delete "distinct from the second visually distinguishable indica; and" and insert --distinct from the second visually distinguishable indicia; and-- therefor.

Signed and Sealed this  
Eleventh Day of July, 2017

Joseph Matal  
*Performing the Functions and Duties of the  
Under Secretary of Commerce for Intellectual Property and  
Director of the United States Patent and Trademark Office*